US008621531B2

(12) United States Patent
Casey et al.

(10) Patent No.: US 8,621,531 B2
(45) Date of Patent: Dec. 31, 2013

(54) REAL-TIME ON DEMAND SERVER

(75) Inventors: Steven M. Casey, Littleton, CO (US);
Charles I. Cook, Louisville, CO (US);
Michael D. Sprenger, Boulder, CO
(US); Steve Goeringer, Westminster, CO
(US); Gnanasegeran Selvadurai,
Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 1326 days.

(21) Appl. No.: 11/291,274

(22) Filed: Nov. 30, 2005

(65) Prior Publication Data

US 2007/0124416 A1    May 31, 2007

(51) Int. Cl.
*H04N 7/173* (2011.01)
*H04N 7/16* (2011.01)

(52) U.S. Cl.
USPC ............ 725/87; 725/88; 725/91; 725/92; 725/94; 725/95; 725/103; 725/104; 725/114; 725/115; 725/138; 725/144

(58) Field of Classification Search
None
See application file for complete search history.

(56) References Cited

U.S. PATENT DOCUMENTS

| 5,191,410 A | 3/1993 | McCalley et al. |
| 5,289,371 A | 2/1994 | Abel et al. |
| 5,600,573 A | 2/1997 | Hendricks et al. |
| 5,659,653 A | 8/1997 | Diehl et al. |
| 5,790,935 A | 8/1998 | Payton |
| 5,918,013 A | 6/1999 | Mighdoll et al. |
| 5,945,988 A | 8/1999 | Williams et al. |
| 6,035,038 A | 3/2000 | Campinos et al. |
| 6,173,316 B1 * | 1/2001 | De Boor et al. ............... 709/218 |
| 6,237,031 B1 | 5/2001 | Knauerhase et al. |
| 6,256,691 B1 | 7/2001 | Moroz et al. |
| 6,536,041 B1 * | 3/2003 | Knudson et al. ............... 725/39 |
| 6,698,020 B1 | 2/2004 | Zigmond et al. |
| 6,741,684 B2 | 5/2004 | Kaars |
| 7,089,309 B2 | 8/2006 | Ramaley et al. |
| 7,103,906 B1 * | 9/2006 | Katz et al. ...................... 725/87 |
| 7,120,702 B2 | 10/2006 | Huang et al. |
| 7,165,725 B2 | 1/2007 | Casey |
| 7,386,871 B1 | 6/2008 | Knudson et al. |
| 7,444,658 B1 | 10/2008 | Matz et al. |
| 7,454,709 B1 | 11/2008 | Appelman |
| 7,568,209 B1 | 7/2009 | Addington et al. |

(Continued)

FOREIGN PATENT DOCUMENTS

WO    WO 2005091626    9/2005

OTHER PUBLICATIONS

Grumet, Andrew, "Hack: RSS Powered Tivo To-Do Lists," http://grumet.net/writing/programmer/syndication/rss-powered-tivo-todo-lists, 6 pages, Jul. 14, 2005.

(Continued)

*Primary Examiner* — Nasser Goodarzi
*Assistant Examiner* — Mary A Kay
(74) *Attorney, Agent, or Firm* — Swanson & Bratschun, L.L.C.

(57) ABSTRACT

Various embodiments of the invention provide novel solutions for providing real-time content in an on-demand environment. In a novel aspect of some embodiments, a real-time on demand server may be configured to integrate real-time content with on-demand content. This can allow a subscriber to enjoy the benefits of on-demand programming without having to forego access to real-time news, sports, weather information and/or the like.

40 Claims, 17 Drawing Sheets

(56) References Cited

U.S. PATENT DOCUMENTS

| | | | |
|---|---|---|---|
| 7,592,912 B2 | 9/2009 | Hasek et al. | |
| 7,654,462 B2 | 2/2010 | Casey | |
| 8,015,167 B1 | 9/2011 | Riggs et al. | |
| 8,583,758 B2 | 11/2013 | Casey et al. | |
| 2001/0011284 A1 | 8/2001 | Humpleman et al. | |
| 2001/0047517 A1 | 11/2001 | Christopoulos et al. | |
| 2002/0016919 A1 | 2/2002 | Sims | |
| 2002/0016971 A1 | 2/2002 | Berezowski et al. | |
| 2002/0026645 A1 | 2/2002 | Son et al. | |
| 2002/0049977 A1 | 4/2002 | Miller et al. | |
| 2002/0056109 A1 | 5/2002 | Tomsen | |
| 2002/0069223 A1* | 6/2002 | Goodisman et al. | 707/513 |
| 2002/0069420 A1 | 6/2002 | Russell et al. | |
| 2002/0075332 A1* | 6/2002 | Geilfuss et al. | 345/859 |
| 2002/0104099 A1* | 8/2002 | Novak | 725/136 |
| 2002/0118954 A1 | 8/2002 | Barton et al. | |
| 2002/0144279 A1* | 10/2002 | Zhou | 725/95 |
| 2002/0174430 A1 | 11/2002 | Ellis et al. | |
| 2002/0188945 A1 | 12/2002 | McGee et al. | |
| 2003/0009765 A1* | 1/2003 | Linden et al. | 725/95 |
| 2003/0018971 A1 | 1/2003 | McKenna, Jr. | |
| 2003/0050062 A1* | 3/2003 | Chen et al. | 455/435 |
| 2003/0086023 A1 | 5/2003 | Chung et al. | |
| 2003/0098869 A1* | 5/2003 | Arnold et al. | 345/589 |
| 2003/0145331 A1 | 7/2003 | Escobar et al. | |
| 2003/0149975 A1 | 8/2003 | Eldering et al. | |
| 2003/0149988 A1* | 8/2003 | Ellis et al. | 725/87 |
| 2003/0193484 A1 | 10/2003 | Lui et al. | |
| 2003/0226142 A1 | 12/2003 | Rand | |
| 2004/0008972 A1 | 1/2004 | Haken | |
| 2004/0024702 A1 | 2/2004 | Angel et al. | |
| 2004/0039781 A1 | 2/2004 | LaVallee et al. | |
| 2004/0088558 A1 | 5/2004 | Candelore | |
| 2004/0111756 A1* | 6/2004 | Stuckman et al. | 725/142 |
| 2004/0117248 A1* | 6/2004 | Dutta et al. | 705/14 |
| 2004/0117831 A1 | 6/2004 | Ellis et al. | |
| 2004/0143620 A1 | 7/2004 | Fisher et al. | |
| 2005/0010635 A1 | 1/2005 | Schwesig et al. | |
| 2005/0021414 A1* | 1/2005 | Liebenow | 705/26 |
| 2005/0034171 A1* | 2/2005 | Benya | 725/143 |
| 2005/0047752 A1 | 3/2005 | Wood et al. | |
| 2005/0060759 A1 | 3/2005 | Rowe et al. | |
| 2005/0102385 A1 | 5/2005 | Muhonen et al. | |
| 2005/0108769 A1 | 5/2005 | Arnold et al. | |
| 2005/0130685 A1 | 6/2005 | Jankin | |
| 2005/0143136 A1 | 6/2005 | Lev et al. | |
| 2005/0155063 A1* | 7/2005 | Bayrakeri et al. | 725/47 |
| 2005/0195978 A1* | 9/2005 | Babic et al. | 380/231 |
| 2005/0198290 A1 | 9/2005 | Berkey et al. | |
| 2005/0210507 A1 | 9/2005 | Hawkins et al. | |
| 2005/0216594 A1 | 9/2005 | O'Brien et al. | |
| 2005/0262540 A1 | 11/2005 | Swix et al. | |
| 2005/0262542 A1 | 11/2005 | DeWeese et al. | |
| 2005/0273833 A1 | 12/2005 | Soinio | |
| 2006/0046744 A1 | 3/2006 | Dublish et al. | |
| 2006/0143481 A1 | 6/2006 | Morten | |
| 2006/0168123 A1 | 7/2006 | Krstulich | |
| 2006/0205434 A1 | 9/2006 | Tom et al. | |
| 2006/0265427 A1 | 11/2006 | Cohen et al. | |
| 2006/0271652 A1 | 11/2006 | Stavrakos et al. | |
| 2006/0280303 A1* | 12/2006 | Gupte | 380/239 |
| 2006/0282304 A1 | 12/2006 | Bedard et al. | |
| 2007/0083901 A1* | 4/2007 | Bond | 725/94 |
| 2007/0088850 A1 | 4/2007 | Alperin et al. | |
| 2007/0121651 A1 | 5/2007 | Casey et al. | |
| 2007/0121856 A1 | 5/2007 | Alperin et al. | |
| 2007/0121940 A1 | 5/2007 | Park | |
| 2007/0124769 A1 | 5/2007 | Casey et al. | |
| 2007/0124779 A1 | 5/2007 | Casey et al. | |
| 2007/0124781 A1 | 5/2007 | Casey et al. | |
| 2007/0130155 A1 | 6/2007 | Alperin et al. | |
| 2007/0130340 A1 | 6/2007 | Alperin et al. | |
| 2007/0192807 A1 | 8/2007 | Howcroft | |
| 2007/0239833 A1 | 10/2007 | Alperin et al. | |
| 2007/0239880 A1 | 10/2007 | Alperin et al. | |
| 2007/0239895 A1 | 10/2007 | Alperin et al. | |
| 2007/0240065 A1 | 10/2007 | Alperin et al. | |
| 2007/0271532 A1 | 11/2007 | Nguyen et al. | |
| 2008/0098442 A1 | 4/2008 | Greenbaum | |
| 2008/0181189 A1 | 7/2008 | Yoo | |
| 2008/0184297 A1 | 7/2008 | Ellis et al. | |
| 2008/0279215 A9 | 11/2008 | Wendling et al. | |
| 2009/0007171 A1 | 1/2009 | Casey et al. | |
| 2009/0007176 A1 | 1/2009 | Casey et al. | |
| 2009/0063645 A1 | 3/2009 | Casey et al. | |
| 2009/0252329 A1 | 10/2009 | Casey et al. | |
| 2010/0333153 A1 | 12/2010 | Sahota et al. | |
| 2012/0272260 A1 | 10/2012 | Casey et al. | |

OTHER PUBLICATIONS

Ortikon Interactive Ltd., "Ortikon ACE IPTV Middleware," 8 pages, no date.

IBM Research, "Intermediares and Transcoding" http://web.archive.org/web/20021219072117/http://www.almaden.ibm.com/cs/wbi/wbi-an, 2 pages, Oct. 8, 2008.

*Television is coming to a cell phone near you.* Http://pd.pennet.com/Articles/Article_Display.cfm?Section=Articles&Subsection=Display&Article_ID; dated Jul. 20, 2004, 4 pages.

*Sony Portable TV & MPEG4 recorder*, htt;://www.icube.us/sony_msv-al/product_overview.htm, dated Jul 20, 2004, 1 page.

dynamism.com. *Sony MSV-A1— Portable TV*, http://www.dynamism.com/msv-al/, dated Jul. 20, 2004, 1 page.

Xvision Systems, Play and Convert your media files; mp3, way, asf, avi, mpg and more...., *About MPG, MPEG-4*. http://www.svonline.com/xfiles,about_mpg.htm, dated Oct. 28, 2004, 2 pages.

U.S. Appl. No. 12/147,665, Office Action dated Jun. 25, 2010, 26 pages.

U.S. Appl. No. 11/291,806, Office Action dated Oct. 28, 2008, 34 pages.

U.S. Appl. No. 11/291,806, Final Rejection dated Apr. 29, 2009. 32 pages.

U.S. Appl. No. 11/291,325, Office Action, dated Oct. 22, 2008, 101 pages.

U.S. Appl. No. 11/291,325, Final Rejection, dated Apr. 1, 2009, 36 pages.

U.S. Appl. No. 11/291,324, Final Office Action, dated Apr. 22, 2009, 21 pages.

U.S. Appl. No. 11/291,324, Office Action dated Nov. 12, 2009, 21 pages.

U.S. Appl. No. 11/291,324, Office Action, dated Oct. 28, 2008, 16 pages.

U.S. Appl. No. 11/291,324, Final Rejection, dated May 26, 2010, 22 pages.

U.S. Appl. No. 11/060,222, Office Action dated Oct. 19, 2005, 10 pages.

U.S. Appl. No. 11/060,222, Office Action dated Jan. 24, 2006, 10 pages.

U.S. Appl. No. 11/060,222, Office Action dated Jun. 15, 2006, 11 pages.

U.S. Appl. No. 11/060,222, Notice of Allowance, dated Nov. 17, 2006, 3 pages.

U.S. Appl. No. 11/060,222, Notice of Allowability, dated Nov. 17, 2006, 4 pages.

U.S. Appl. No. 11/291,326, Office Action dated Oct. 14, 2008, 19 pages.

U.S. Appl. No. 11/291,326, Final Rejection dated Feb. 24, 2009, 17 pages.

U.S. Appl. No. 11/291,326, Office Action dated Jul. 13, 2009, 19 pages.

U.S. Appl. No. 11/291,326, Final Rejection dated Jan. 22, 2010, 23 pages.

U.S. Appl. No. 12/147,665, Final Rejection dated Dec. 3, 2010, 32 pages.

U.S. Appl. No. 12/147,674, Office Action dated Dec. 22, 2010, 41 pages.

U.S. Appl. No. 12/147,652, Office Action dated Mar. 1, 2011, 25 pages.

(56) References Cited

OTHER PUBLICATIONS

U.S. Appl. No, 12/061,046; Final Office Action dated Oct. 14, 2011; 17 pages.
U.S. Appl. No. 12/147,652, Office Action dated Aug. 18, 2011, 22 pages.
U.S. Appl. No. 12/061,046, Non-Final Office Action dated Apr. 28, 2011, 22 pages.
U.S. Appl. No. 12/147,674, Office Action dated Jun. 15, 2011, 42 pages.
U.S. Appl. No. 12/061,046; Notice of Allowance dated Apr. 2, 2012; 35 pages.
U.S. Appl. No. 12/061,046; Supplemental Notice of Allowability dated Apr. 19, 2012; 5 pages.
U.S. Appl. No. 12/147,674; Non-Final Rejection dated May 10, 2012; 59 pages.
U.S. Appl. No. 11/291,324; Non Final Office Action dated Jan. 3, 2012; 32 pages.
U.S. Appl. No. 12/147,652, Final Office Action dated Jan. 4, 2012, 20 pages.
U.S. Appl. No. 11/291,326, Final Rejection dated Nov. 29, 2012; 40 pages.
U.S. Appl. No. 12/147,652, Non-Final Rejection dated Oct. 26, 2012; 29 pages.
U.S. Appl. No. 12/147,674; Final Rejection dated Oct. 19, 2012; 63 pages.
U.S. Appl. No. 11/291,324; Final Rejection dated Jul. 26, 2012; 28 pages.
U.S. Appl. No. 11/291,326; Non-Final Rejection dated Sep. 14, 2012; 47 pages.
U.S. Appl. No. 12/061,046, Issue Notification dated Jul. 18, 2012; 1 page.
U.S. Appl. No. 12/147,652, Final Rejection dated Mar. 20, 2013; 30 pages.
U.S. Appl. No. 11/291,324; Non-Final Rejection dated Oct. 3, 2013; 38 pages.
U.S. Appl. No. 11/291,326; Notice of Allowance dated Jul. 9, 2013; 35 pages.
U.S. Appl. No. 11/291,326; Issue Notification dated Oct. 23, 2013; 1 page.

* cited by examiner

```
<PBC Title="Joe's PBC">

<CONTENT>
        <Title>Local News</Title>
        <REQUEST-TYPE>real-time</REQUEST-TYPE>
        <TYPE>Video</TYPE>
        <FORMAT>MP2</FORMAT>
        <START-TIME>22:00:00</START-TIME>
        <LENGTH>0:15:00</LENGTH>
        <URI>file://secure.newschannel.com/current/latelocal.mp2</URI>
</CONTENT>

<CONTENT>
        <Title>Advertisements</Title>
        <REQUEST-TYPE>dynamic advertising</REQUEST-TYPE>
        <TYPE>Video</TYPE>
        <FORMAT>MP4</FORMAT>
        <LENGTH>0:01:00</LENGTH>
        <URI>file://adserver01/ad.cgi?type=sports&duration=60</URI>
</CONTENT>

<CONTENT>
        <Title>Forrest Gump</Title>
        <REQUEST-TYPE>on-demand</REQUEST-TYPE>
        <TYPE>Video</TYPE>
        <FORMAT>MP4</FORMAT>
        <LENGTH>2:10:05</LENGTH>
        <URI>file://vidserver001/content/mc0034892.mp4</URI>
</CONTENT>

<CONTENT>
        <Title>Web Headlines</Title>
        <REQUEST-TYPE>real-time</REQUEST-TYPE>
        <TYPE>Data</TYPE>
        <FORMAT>HTML</FORMAT>
        <URI>http://www.cnn.com/headlines.html</URI>
</CONTENT>

<CONTENT>
        <Title>Smooth Jazz</Title>
        <REQUEST-TYPE>real-time</REQUEST-TYPE>
        <TYPE>Audio</TYPE>
        <FORMAT>MP3</FORMAT>
        <LENGTH>3:00:00</LENGTH>
        <URI>http://music.com/smooth-jazz/play.cgi</URI>
</CONTENT>

</PBC>
```

- 1035 (Local News block)
- 1040 (Advertisements block)
- 1045 (Forrest Gump block)
- 1050 (Web Headlines block)
- 1060 (Smooth Jazz block)
- 1030 (overall PBC)

Fig. 10b

ID
REAL-TIME ON DEMAND SERVER

CROSS-REFERENCES TO RELATED APPLICATIONS

This application is related to the following commonly-owned, co-pending applications, of which the entire disclosure of each is incorporated herein by reference: U.S. patent application Ser. No. 11/291,3261, filed on Nov. 30, 2005, by Casey et al. and entitled "Network-Based Format Conversion"; U.S. patent application Ser. No. 11/291,806 (now abandoned), filed on Nov. 30, 2005, by Casey et al. and entitled "Networked Content Storage"; and U.S. patent application Ser. No. 11/291,325 (now abandoned) filed on Nov. 30, 2005, by Casey et al. and entitled "Personal Broadcast Channels"; and U.S. patent application Ser. No. 11/291,324, filed on Nov. 30, 2005, by Casey et al. and entitled "Networked PVR System".

BACKGROUND OF THE INVENTION

The present invention relates generally to entertainment content and more particularly to the distribution of such entertainment content.

Traditionally, consumers have been forced to consume entertainment content in a relatively structured manner. For example, prior to the advent of cable television, a consumer had relatively few choices in television programming. In any given market, there were a few broadcast stations (most associated with one of the three major networks) offering video content. A consumer wishing to view a particular program had to determine on which station, and at which time, the program would be aired. Video cassette recorders, as well as cable and satellite television introduced increased variety and timing options, but a consumer still had limited choices in television programming.

Over the past few years, entertainment options for consumers have grown dramatically. There is an ever-increasing variety of content available to consumers via cable networks, satellite distribution, over-the-air broadcasts, the Internet etc., including without limitation digital and analog video, audio and multimedia content. Moreover, a variety of devices, such as wireless phones, handheld devices (including PDA, game consoles, etc.) provide more flexibility in the consumption of such content. Similarly, on-demand services and personal video recorders ("PVR") have increased the flexibility available to consumers regarding when such content is consumed.

As a result, there is a trend toward consumers viewing (and/or listening to, interacting with, etc.) entertainment content when and where they desire. For example, a typical consumer, instead of waiting until a given broadcast window to watch a desired program, might request the program on-demand, at the time the consumer desires to watch the program. Alternatively, and/or in addition, the consumer might configure a PVR to automatically record the program for later viewing.

The present invention provides further enhancements to this on-demand model of content consumption.

BRIEF SUMMARY OF THE INVENTION

Various embodiments of the invention provide novel solutions for providing real-time content in an on-demand environment. In a novel aspect of some embodiments, a real-time on demand server may be configured to integrate real-time content with on-demand content. This can allow a subscriber to enjoy the benefits of on-demand programming without having to forego access to real-time news, sports, weather information and/or the like.

One set of embodiments provides methods, including without limitation methods for providing real-time content in an on-demand environment. An exemplary method might comprise monitoring at least one source of real-time content and/or identifying a set of real-time content that should be provided to a subscriber. The method might further comprise obtaining the identified set of real-time content. The identified set of real-time content then might be provided, for example, through a content-on-demand environment. Hence, the identified set of real-time content is available in real-time to the subscriber.

Another exemplary method might comprise receiving (e.g., at a server) a set of real-time content and/or determining that the identified set of real-time content should be provided to a subscriber. The method might further comprise providing the identified set of real-time content through a content-on-demand environment. Accordingly, the real-time content might be made available in real-time to the subscriber.

Another set of embodiments provides systems, including without limitation systems configured to perform methods of the invention. An exemplary system comprises a real-time content monitor server and a network update transmission server. The real-time content monitor server might be configured to monitor at least one source of real-time content and/or identify a set of real-time content that should be provided to a subscriber. The network update transmission server might be configured to obtain the identified set of real-time content. In some embodiments, the system further comprises a subscriber interface configured to provide the identified set of real-time content through a content-on-demand environment, such that the identified set of real-time content is available in real-time to the subscriber.

Yet another set of embodiments provides computer programs. In some embodiments, a computer program might comprise instructions executable by one or more processors to perform methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIG. 10b illustrates a personal broadcast channel definition for the personal broadcast channel of FIG. 10a.

DETAILED DESCRIPTION OF THE INVENTION

Figure 1:
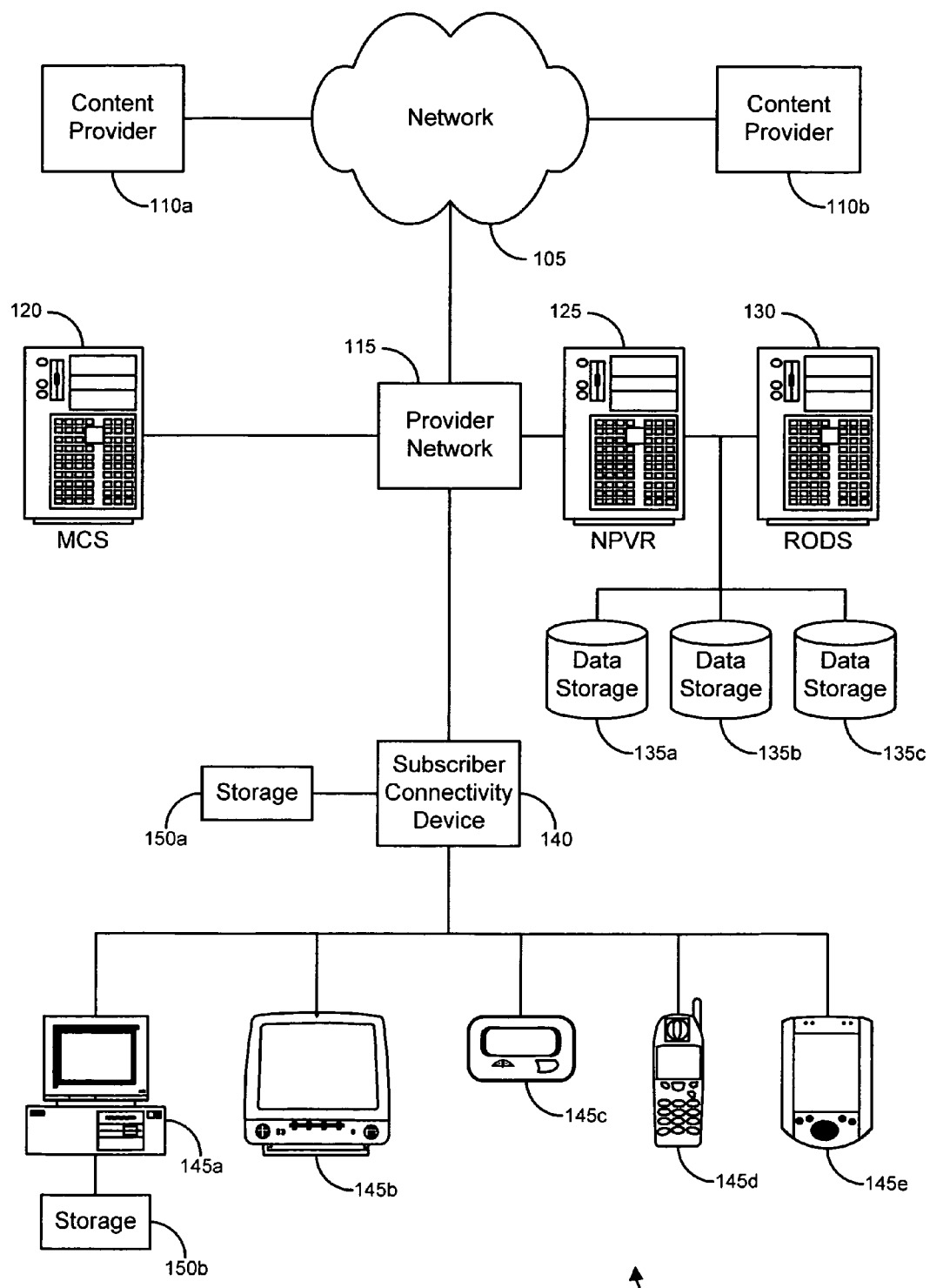
FIG. 1 is a schematic diagram of a system for providing services in accordance with embodiments of the invention.

Embodiments of the invention provide a novel model for the distribution of content, which can include, among other things, video content (such as television programming, movies, etc.), audio content (such as radio programming, audio recordings, etc.), data content (such as Internet data-web pages, electronic mail, etc.), voice transmissions (such as telephone transmissions, etc.) and/or the like. Various embodiments provide devices, methods and systems for providing such distribution services.

1. Overview

Certain embodiments of the invention can be used to deliver and/or receive a variety of content-based services. In a set of embodiments, a service provider (who may be a telecommunications provider, such as a telephone provider, cable provider, xDSL provider) may operate a network that can be used to provide such services. In another set of embodiments, one or more connectivity devices may provide connectivity between a provider's network and various content-playing devices, such as televisions, stereo receivers, computers, telephones, personal digital assistants (PDAs), portable music players and/or the like, which may be used to play content in accordance with embodiments of the invention.

Examples of such networks and connectivity devices, as well as some of the content-playing devices that may be used in various embodiments, are disclosed in detail in the following commonly-owned, co-pending applications, each of which is incorporated herein by reference: U.S. application Ser. No. 10/377,282, (now abandoned) filed Feb. 27, 2003 by Casey et al. and entitled "SYSTEMS AND METHODS FOR DISPLAYING DATA OVER VIDEO"; U.S. application Ser. No. 10/356,364 (now U.S. Pat. No. 7,180,988), filed Jan. 31, 2003 by Phillips et al. and entitled "PACKET NETWORK INTERFACE DEVICE AND SYSTEMS AND METHODS FOR ITS USE"; U.S. application Ser. No. 10/356,688 (now U.S. Pat. No. 7,454,006), filed Jan. 31, 2003 by Phillips et al. and entitled SYSTEMS, METHODS AND APPARATUS FOR PROVIDING A PLURALITY OF TELECOMMUNICATIONS SERVICES"; U.S. application Ser. No. 10/356,338 (now U.S. Pat. No. 8,537,814), filed Jan. 31, 2003 by Phillips et al. and entitled "CONFIGURABLE NETWORK INTERFACE DEVICE AND SYSTEMS AND METHODS FOR ITS USE"; U.S. application Ser. No. 10/367,596 (now abandoned), filed Feb. 14, 2003 by Casey et al. and entitled "SYSTEMS AND METHODS FOR DELIVERING A DATA STREAM TO A VIDEO APPLIANCE"; U.S. application Ser. No. 10/367,597 (now U.S. Pat. No. 7,433,465), filed Feb. 14, 2003 by Casey et al. and entitled "SYSTEMS AND METHODS FOR PROVIDING APPLICATION SERVICES"; U.S. application Ser. No. 10/377,290 (now abandoned), filed Feb. 27, 2003 by Phillips et al. and entitled SYSTEMS AND METHODS FOR FORMING PICTURE-IN-PICTURE SIGNALS"; U.S. application Ser. No. 10/377,283 (now abandoned), filed Feb. 27, 2003 by Phillips et al. and entitled "SYSTEMS AND METHODS FOR MONITORING VISUAL INFORMATION"; U.S. application Ser. No. 10/377,584 (now U.S. Pat. No. 7,187,418), filed Feb. 27, 2003 by Phillips et al. and entitled "SYSTEMS AND METHODS FOR DELIVERING PICTURE-IN-PICTURE SIGNALS AT DIVERSE COMPRESSIONS AND BANDWIDTHS"; U.S. application Ser. No. 10/377,281 (now abandoned), filed Feb. 27, 2003 by Phillips et al. and entitled "SYSTEMS AND METHODS FOR PROVIDING AND DISPLAYING PICTURE-IN-PICTURE SIGNALS"; U.S. application Ser. No. 10/444,941, filed May 22, 2003 by Phillips et al. and entitled "SYSTEMS AND METHODS FOR PROVIDING TELEVISION SIGNALS USING A NETWORK INTERFACE DEVICE"; U.S. application Ser. No. 10/448,249 (now abandoned), filed May 29, 2003 by Phillips et al. and entitled "METHODS AND APPARATUS FOR DELIVERING A COMPUTER DATA STREAM TO A VIDEO APPLIANCE WITH A NETWORK INTERFACE DEVICE"; U.S. application Ser. No. 10/624,454 (now U.S. Pat. No. 7,793,003), filed Jul. 21, 2003 by Casey et al. and entitled "SYSTEMS AND METHODS FOR INTEGRATING MICROSERVERS WITH A NETWORK INTERFACE DEVICE"; U.S. application Ser. No. 11/060,633 (now U.S. Pat. No. 7,377,440), filed Feb. 16, 2005 by Casey and entitled "MEDIA SERVICES MANAGER FOR BASE STATION"; U.S. application Ser. No. 11/060,224, filed Feb. 16, 2005 by Casey and entitled "WIRELESS DIGITAL VIDEO RECORDER"; and U.S. application Ser. No. 11/292,210 (now U.S. Pat. No. 7,654,462, filed Nov. 30, 2005 by Casey and entitled "MOBILE DEVICE BASE STATION FOR ENHANCED SIGNAL STRENGTH FOR ON-DEMAND MEDIA SERVICES". In accordance with some embodiments of the invention, such networks and devices may be modified as appropriate.

Embodiments of the invention may provide a variety of content services, perhaps using networks and/or devices such as those described in these applications incorporated by reference above. A particular set of embodiments, for example, can enable the provision of content-on-demand services (such as, for example, video on demand). Another set of embodiments can allow a service provider to integrate real-time programming (such as news, sports, important updates and/or the like) with on-demand content, enabling unforeseen flexibility in the provision of content to subscribers. Certain embodiments feature novel solutions to deal with network storage requirements, while other embodiments allow for the provision of personalized content "channels," which may be analogous to the broadcast channels currently known in the art, but which may be customizable by a subscriber to allow the subscriber to specify the content that will be provided on a particular "channel." Hence, embodiments of the invention provide a variety of new solutions to provide content to a subscriber. Certain embodiments provide "downloadable" content to a subscriber. As used herein, the term "downloadable" should be interpreted in a broad sense, to include any type of content that may be transferred for consumption by a subscriber. Such content may include, merely by way of example, file downloads, streaming content, broadcast content, etc. Downloads may be initiated by the subscriber, by the system, and/or by another, depending on the embodiment.

As noted above, in accordance with some embodiments, such services may be provided over a system, which may be similar to any of the networks disclosed in the applications incorporated above by reference (perhaps with modifications as appropriate). Merely by way of example, FIG. 1 illustrates a system 100 that may be used to provide content-on-demand services. The system 100 may include a communication network 105, which can be any of several different types of communication networks. Merely by way of example, the network 105 can be the Internet. In other embodiments, the network 105 can be a telecommunication provider's network, including for example, an asynchronous transfer mode ("ATM") network, a time-division multiplexed ("TDM") network, a wireless network (including, for instance, cellular networks, personal communication service ("PCS") networks, 802.11 networks, and the like), and/or a cable television distribution network. In many cases, the network 105 can be a composite of a plurality of these (and other) types of networks. In short, the network 105 can be any public or private network capable of transporting content (e.g., video, audio, data, etc.) as described herein. In some cases, the network 105 will be capable of transmitting packeted data, for instance, data formatted according to the TCP/IP suite of protocols.

In some embodiments, the system 100 may include (and/or be in communication with) one or more content providers 110, which may be television studios and/or broadcasters, radio broadcasters, motion picture studios, data providers, etc. Depending on the embodiments, a content provider 110 may be any entity that provides content (in any suitable form) that may be provided on demand and/or in real-time to a subscriber. In certain embodiments, one or more of the content provider(s) 110 may have agreements with a service provider to provide content for distribution to subscribers. Such agreements may provide for per-viewing fees payable from the service provider to the content provider, for the insertion of advertisements (by the service provider, the content provider and/or another) into content provided to subscribers, restrictions upon how the content may be provided (e.g., chronological windows during which certain content may or may not be provided, terms governing the provision of real-time content later upon demand, etc.), terms related to digital rights management, terms related to the tracking of content provided to subscribers, and/or other terms as appropriate.

The network 105 may also be in communication with (and/or comprise and/or be incorporated within) a service provider network 115. One skilled in the art will appreciate that the configuration of the service provider network 115 generally will depend on the type of service that the service provider furnishes. Merely by way of example, if the service provider operates a POTS and/or DSL network, the service provider network 115 may comprise one or more switching and or devices (including without limitation service switching points ("SSP"), signal transfer points ("STP") and/or service control points ("SCP")), intelligent peripherals and/or other standard devices, as well, perhaps, as one or more interface devices and/or multiplexors, such as a digital subscriber line access multiplexer ("DSLAM"). As another example, if the service provider provides cable television services, the service provider network may comprise a cable television head end unit, as well, perhaps as supporting infrastructure. One skilled in the art will appreciate, based on the disclosure herein, that such standard devices may be modified to communicate with devices (including servers, storage devices, etc.) configured to perform the functions described herein, and that such standard devices otherwise may be configured otherwise to perform in a manner known in the art and/or may be modified to perform functions of the invention.

Merely by way of example, the system 100 may further comprise a media conversion server ("MCS") 120, a networked personal video recorder ("NPVR") 125, and/or a real-time on-demand ("ROD") server 130, all of which are described in further detail below. The terms "media conversion server," "networked personal video recorder" and "real-time on-demand server" are used herein for descriptive purposes only, and no limitation on the functionality of such devices should be inferred from the use of such terms. Moreover, while the illustrated system 100 employs separate devices for the MCS 120, NPVR 125 and ROD server 130, respectively, other embodiments may consolidate the functionality of one or more of these devices into a single device. Likewise, the functions of any one of these devices 120, 125, 130 may be divided among a plurality of devices, as explained in more detail below.

The system 100 may also feature one or more data storage devices 135, which may comprise one or more hard drives, a drive array (such as a redundant array of inexpensive disks ("RAID")), a storage area network ("SAN"), and/or the like, which may be in communication with the provider network. The storage device(s) 135 may be arranged in any of several configurations known in the art, and/or they may be used to provide temporary and/or relatively permanent storage of content, perhaps for delivery on demand. In a set of embodiments, as described in more detail below, the storage device (s) 135 may be used to provide a content library.

In some embodiments, the service provider's network 115 (and/or components thereof) may be in communication with a subscriber connectivity device 140, which may provide communication with one or more subscriber devices 145, including without limitation one or more computers 145a (which may include without limitation, personal computers, workstations, laptop computers, game consoles, etc.), televisions 145b, pagers 145c, telephones 145d (which may include without limitation wired phones, such as POTS phones, SIP phones, VOIP phones, PBX phones, etc., and/or wireless phones, such as GSM phones, cellular phones, etc.), handheld devices 145e (which may include without limitation media players, personal digital assistants, handheld game consoles, e-book readers, etc.), stereo receivers, and/or any other type of device that can be used to present content to a subscriber (or another). In this context, the term "to present content" means any procedure by which content is displayed, played, etc. for consumption by a subscriber; one skilled in the art will appreciate that how a particular set of content is presented often will depend on the nature of the content. Merely by way of example, presenting a television program may comprise receiving, storing and/or displaying a stream of images and/or sounds comprising the television program, while presenting an e-book may comprise simply displaying a text file (or a binary file comprising the relevant text) for the subscriber.

The nature of the subscriber connectivity device 140 depends on the embodiment. In general, a subscriber connectivity device 140 may be any device that provides communication between one or more subscriber devices and a provider's network (and/or components thereof). Merely by way of example, in certain embodiments, the subscriber connectivity device may be a demarcation device (including without limitation a network interface device) such as those described in the applications incorporated by reference above. In other embodiments, the subscriber connectivity device 140 may comprise (and/or be incorporated in) a set-top box, a modem (such as a cable modem, DSL modem, etc.), a router, a firewall or gateway, etc. In some embodiments, a plurality of subscriber connectivity devices 140 (e.g., different connectivity devices for different subscriber devices, such as a set top box for a television, a cable modem for a computer, etc.) may be used. In other embodiments, the subscriber connectivity device may be unnecessary (and/or may be integrated with a subscriber device), such that a direct connection between a subscriber device (e.g., a GSM phone) and a provider network (e.g., a wireless network) may be used instead.

In some cases the subscriber connectivity device 140 and/or one or more subscriber devices 145 might include local storage 150 (such as an incorporated and/or attached hard drive, media reader, etc.). In embodiments of the invention, such local storage may be used to cache and/or more permanently store content, which might be provided by the subscriber and/or obtained from the network (e.g., via the subscriber connectivity device 140). For portable devices, this can allow content to be taken with the subscriber device 145. In other cases, this can also provide the opportunity for the subscriber to store content in a relatively more accessible location and/or to host content for the provider and/or other subscribers, as described in detail below.

In accordance with a set of embodiments, then, a service provider may receive at the provider network 115 a set of content (e.g., a video program) from a content provider 110*a*. That content may be cached and/or stored by an NPVR server 125 on one or more storage devices 135*a*. When a subscriber requests the content (for instance, through the use of a content-on-demand service), the content may be retrieved from the cache by the NPVR server 125 and/or provided to the subscriber (for example, via the subscriber connectivity device 140 and/or one of the subscriber devices).

In some cases, there may be some real-time content that would be appropriate for presentation to the subscriber. Such real-time content could include, merely by way of example, news, financial information (e.g., stock quotes, etc.), sporting events, traffic and/or weather information and/or the like. In such cases, the RODS 130 may receive such real-time content (e.g., from a content provider 110) and/or insert the real-time content into a stream of content (which may be on-demand content) provided to the subscriber by the NPVR server 125. As described below, there are a variety of procedures for inserting real-time content into an on-demand stream. Any of these procedures may be used in various embodiments of the invention.

Depending on the nature of the content to be presented to a subscriber, there may be a need for conversion of the content's format. As described in more detail below, in accordance particular embodiments, the MCS 120 may be used to convert the format of any content, depending perhaps on the type of subscriber device that may be used to present the content.

In some cases, the subscriber connectivity device 140 may be used to manage the connection between the service provider and the subscriber. For example, in accordance with particular embodiments, the subscriber connectivity device 140 may be configured to determine which subscriber device a subscriber would like to have provide a certain set of content (for example, a video program). The subscriber connectivity device 140 might maintain a list of profiles for various devices (including, for example, connectivity options, device capabilities, etc.) and/or based on the profile of the chosen device, select an appropriate format for the content to be provided. In another aspect, the subscriber connectivity device 140 might be configured to accept input (e.g., via an on-screen menu, web page, etc.) from a subscriber detailing the device to provide the content as well, perhaps, as the format of the content to be provided. In other cases, the subscriber (and/or the subscriber device) might be responsible for providing to the system the type and/or format of content to be provided. In either case, the MCS 120 may be used to provide conversion services among any appropriate format (e.g., from NTSC to MPEG, analog to digital, WAV audio to MPEG3, MPEG2 to MPEG4, etc.).

2. Media Conversion Server

Figure 2:
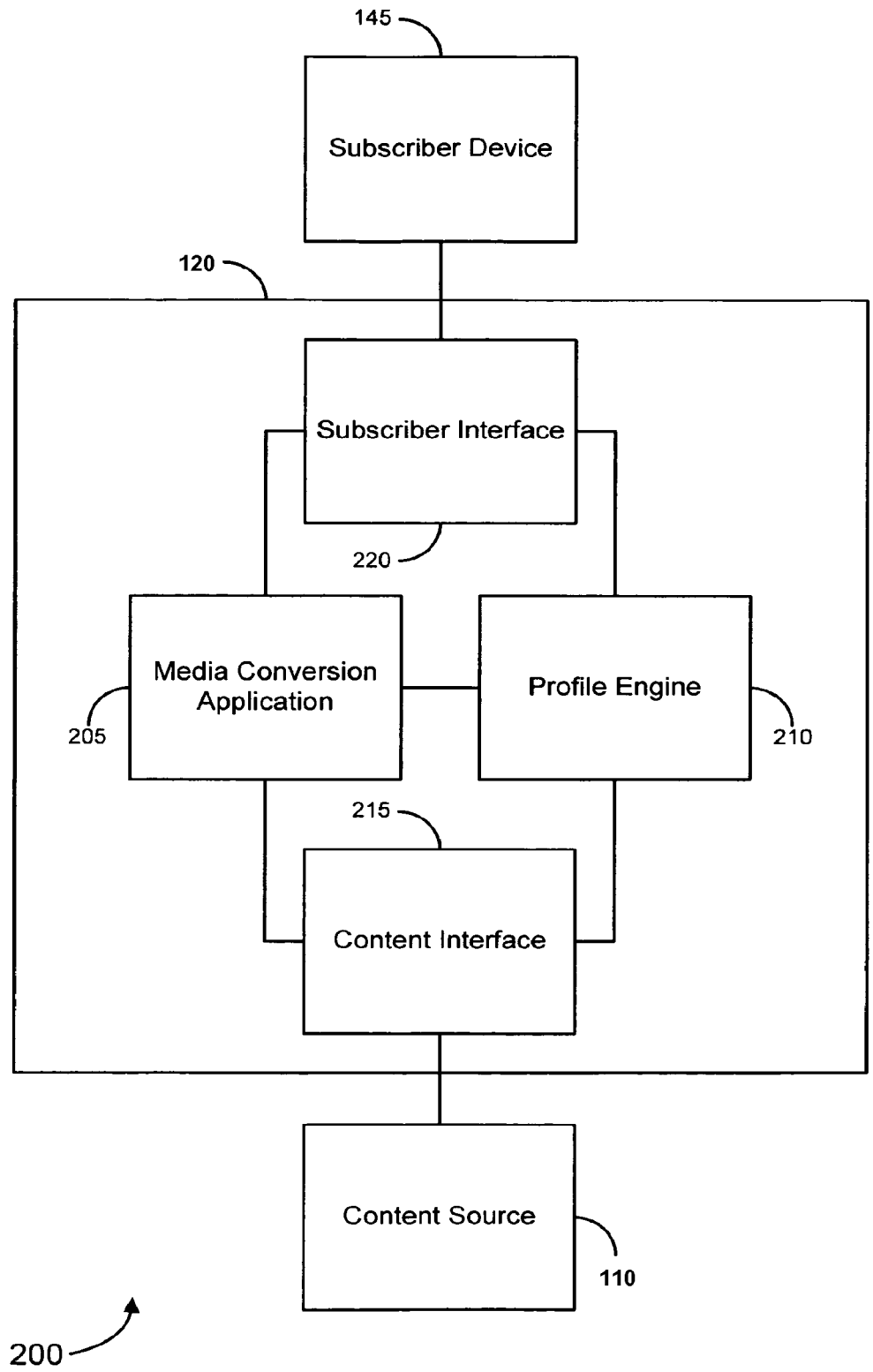
FIG. 2 is a functional diagram illustrating a media conversion server in accordance with embodiments of the invention.

As mentioned above, certain embodiments provide media conversion servers. In some cases, a media conversion server (MCS) may be used in conjunction with a NPVR server and/or a ROD server. In other cases, an MCS may be used on its own, and/or in connection with other services, to provide generalized media conversion services. FIG. 2 illustrates a functional diagram 200 of a MCS 120 in accordance with some embodiments of the invention. The functional components of the MCS 120 illustrated on FIG. 2 may be implemented as software modules, separate hardware devices and/or a combination of each. In particular embodiments, the functional components of the MCS 120 may be incorporated within another device (such as a ROD server and/or a NPVR server, merely by way of example) and/or the functions of an MCS may be organized differently than those illustrated in the exemplary diagram 200 of FIG. 2.

In some embodiments, the MCS comprises a media conversion application 205. The media conversion application may be in communication with a profile engine 210, a content interface 215 and/or a subscriber interface 220. The functions of these components will be described in more detail below.

The subscriber interface 220 provides communication with a subscriber device 145. Such communication may be relatively direct (e.g., a network connection, such as a LAN connection, DSL connection, etc. between the subscriber interface 220 and the subscriber device 145) or relatively indirect (e.g., the subscriber interface 220 may provide communication via an NPVR server, a subscriber connectivity device, etc.), or both (i.e., communication with the MCS 120 may be performed via a subscriber connectivity device and/or NPVR server as well as directly from a subscriber device). In embodiments featuring direct connectivity with subscriber devices. Hence, the nature of the subscriber interface 220 may vary depending on the embodiment, but it often will be a combination of the necessary communication hardware (such as a network interface, wireless interface, etc.) and software (drivers, etc.) for communicating with the subscriber device, whether directly or indirectly. In particular embodiments, for example, the subscriber interface 220 may comprise an Ethernet (or similar) interface and/or appropriate drivers to support TCP/IP communications with the subscriber device 145.

The subscriber interface 220 may also include higher-level applications. Merely by way of example, the subscriber interface 220 may comprise a web server application, which can be used by a subscriber to set preferences and/or establish profiles (as described in more detail below, for example) and/or download/upload content for conversion. The subscriber interface may also comprise an electronic mail interface (including, for example, an SMTP server), such that content may be transmitted to and/or received from a subscriber via electronic mail (perhaps using one or more subscriber email addresses stored in a subscriber profile). In some cases, the subscriber interface 220 may provide a rich site summary ("RSS") feed, such that subscriber devices (and/or a subscriber connectivity device) can subscribe to the RSS feed (e.g., as described in more detail below) to obtain links to new and/or converted content.

The content interface 215 may provide connectivity with a content source 110 (such as, merely by way of example, an NPVR server, a subscriber device—if, for example, a subscriber wishes to upload content—a television network, a catalog or library of content—such as videos, recordings, etc.—and/or the like). The content interface may be similar in nature to the subscriber interface 220 (and, in fact, in some cases, a single interface may serve as the subscriber interface 220 and the content interface 215). Many sources of content may be used, depending on what the subscriber would like to convert. Merely by way of example, the subscriber may wish to upload a file for conversion, may wish to convert a file stored on an NPVR and/or elsewhere, may provide a uniform resource locator ("URL") directing the MCS to a location on the Internet containing a file (or stream, etc.) to be converted, etc.

In a set of embodiments, access to conversion services may be relatively transparent to the subscriber. Merely by way of example, the subscriber may access the MCS 120 (e.g., via a web page, via a subscriber connectivity device, etc.) to set preferences and/or establish/change profiles, but after that, the media conversion services are performed relatively transparently, such that content is provided via an NPVR server and/or subscriber connectivity device in the format needed by the device that will be playing the content, without the subscriber having to take any particular action to convert a particular set of content.

The profile engine 210 serves to store subscriber preferences and/or device profiles for various subscriber devices to be used with the system. For example, in a set of embodiments, a subscriber might be given the ability to define a plurality of devices to the MCS 120 and/or to define the capabilities of such devices. (Alternatively, such devices may be able to advertise their capabilities to the MCS 120 and/or the MCS 120 might be configured to interrogate each subscriber device to determine its capabilities.) In a set of embodiments, the MCS 120 may comprise a data store (such as a database) that stores profiles for various devices (e.g., as records in a database). The MCS 120 may communicate via TCP/IP communications, and/or devices may be identified by IP address, hostname and/or MAC address of the device. In some cases, a particular subscriber device (such as a television) might not support IP communications. In such cases, connectivity might be provided by a subscriber connectivity device that is addressable by IP (and/or by MAC address), and/or the subscriber connectivity device might serve as a proxy for the subscriber device for communications with the MCS 120 (and/or other system components).

As an example of how the profile engine 210 might work, a subscriber might create profiles for four different devices the subscriber would like to display video. The first device, a television, might be able to display only NTSC analog signals. The second device, a computer, might be able to display any MPEG data streams and/or files up to a resolution of 1600×1200 pixels. The third device, a high definition television, might be able to receive digital high-definition television signals, while the fourth device, a wireless phone, might be able to display only MPEG4 files or streams at a resolution of 200×200 pixels. The profile engine 210, then, can be used to store the capabilities of these devices, and thus to properly inform the media conversion application 205 which target format and/or resolution should be provided to a selected subscriber device.

In some embodiments, the profile engine 210 might also be used to track subscriber preferences. For instance, continuing the above example, if a subscriber prefers to receive a lower resolution than the 1600×1200 that the subscriber's computer can support, the profile engine 210 might be configured to note that preference. As another example, the profile engine 210 may be configured to store a user's preferences about which device should receive particular content, and select the appropriate transcoding/conversion for that device. So, for instance, if the subscriber indicates that he or she always likes to download a particular program to his or her wireless phone (as opposed to a computer, television, etc.), and the MCS 120 is instructed to convert that program for the subscriber, the profile engine 210 might automatically instruct the media conversion application 205 to transcode that program to a format/resolution appropriate for the wireless phone. (Of course, the subscriber may also be given the option to determine, on an ad hoc basis, the device to receive the media content and/or the format for the content.)

Another subscriber preference that may be tracked (e.g., by the profile engine 210) is one or more preferred download and/or upload times, days of week, etc. Such preferences may be tracked at any appropriate level of granularity. For instance, in a set of embodiments, a subscriber may be allowed to indicate, generally, the hours, days, etc. at which downloads and/or uploads may be performed, so as to minimize the impact of content transfer on the subscriber's home network, Internet connection, etc. In another set of embodiments, the subscriber may be allowed to specify on a per-device and/or per-transfer basis when downloads and/or uploads should be performed. For instance, the subscriber may indicate that downloads to a PC, set-top box, etc. should be performed during the day on weekdays (i.e., when the subscriber is away from the home), but that downloads to the subscriber's wireless phone should be performed only between midnight and 4:00 am, so as not to impact's the subscriber's use of the wireless phone. Upload preferences (for example, with respect to content that the subscriber would like to upload for conversion), as indicated above, may be handled in similar fashion, although different schedules may be defined for uploads and downloads. Of course, the subscriber may also be given the option to upload and/or download upon demand, perhaps regardless of whether the subscriber has indicated contrary preferences.

The media conversion application 205, then, is capable of providing transcoding and/or conversion between a variety of standard and/or proprietary formats. In a set of embodiments, the media conversion application 205 may comprise a modular architecture, perhaps with one or more APIs, to allow for the development of additional conversion modules (which may be software, firmware, etc.) as standards evolve and/or new proprietary formats are developed. Exemplary formats that may be supported by the media conversion application 205 include, without limitation, MPEG video and audio formats (including MPEG2, MPEG4, H.264 and other standards); various broadcast formats (including high-definition formats such as 1080*p*, 1080*i*, 720*p*, 480*p*, 480*i*, NTSC, PAL, etc.); various Microsoft Windows Media (e.g., WMA and WMV) formats, including without limitation WM9, WM10 and VC-1 formats; various data formats, including without limitation, text, HTML, XML, etc.

The media conversion application 205 may be configured to convert among any of such formats as appropriate. Merely by way of example, if a subscriber wishes to listen to an audio portion of an MPEG video, the media conversion application 205 can be configured to extract the audio portion of the MPEG video file and/or save the audio portion as an MP3 file, which could be downloaded to a portable music player, for example. The media conversion application 205 may also be configured to change the resolution, bitrate, etc. as appropriate for various devices. Merely by way of example, if video content is provided as an MPEG stream (e.g., MPEG2, MPEG4, etc.), and the subscriber desires to view the content on a portable device (e.g., a wireless phone, PDA, etc.), it may be appropriate to downsample the content to an appropriate format (such as the quarter common interface format ("QCIF"), quarter video graphics array ("QVGA"), etc.). As another example, if a video stream is provided in a high-definition (e.g., 720p, 1080i, etc.) format and the subscriber's television supports only standard-definition television signals (480i) or digital television signals (480p), downconversion of the HD signal may be appropriate. As yet another example, the media conversion application 205 may be configured to convert an audio file (such as an MP3 file, WAV file, WMA file, etc.), which may be provided by the system and/or uploaded by a subscriber, to another format, such as a ringtone, etc., which may then be provided (as described herein) to an appropriate device, such as a wireless phone, etc.

In a set of embodiments, the media conversion application 205 can also provide data conversion functionality. For instance, the media conversion application 205 may provide text-to-HTML conversion (or vice-versa), text-to-speech conversion (or vice-versa), HTML resolution adjustment (e.g., formatting a full-screen HTML document for viewing on a wireless phone display, etc.), and/or the like. Merely by way of example, in a set of embodiments, one of the content sources for the MCS 120 may be a voicemail store, and the MCS 120 may be used to convert a voice message to text, which could be emailed to the subscriber, displayed on a computer display and/or television, etc.

As an example of how the MCS 120 might be used, consider the following scenario. Suppose a subscriber wishes to record a video program on a PDA. The subscriber might send an email message to the MCS 120 (and/or to the system generally) and/or visit a web page provided by the MCS 120) (and/or, again, by the system generally). Using, the subscriber interface 220 (which might comprise, for example, an electronic mail and/or web interface), the user could request the recording of the desired video broadcast (which might be a digital file, a streaming video, a broadcast video, etc.) to the desired device. (It should be noted that the subscriber interface 220 could provide other interfaces, including without limitation an automated voice responses system, which might enable a subscriber to request content via voice telephony devices. In other embodiments, the subscriber interface 220 might provide a machine interface and/or API that could allow programmatic requests, such as from a dedicated software client, a subscriber connectivity device—e.g., via an electronic program guide, etc.—and/or the like.)

The subscriber interface 220, then, might forward the request to the media conversion application 205, which might request from the profile engine 210 the type of format, resolution, etc. that is required/desired for the selected device. The profile engine 210, perhaps in conjunction with the media conversion application 205, will use a device identifier associated with the device (such as, for example, an IP address, a MAC address, an identifier assigned by the provider and/or registered by the subscriber, etc.) and obtain a profile for the selected device. Based on this profile, the profile engine 210 determines the proper output format and/or resolution of the video program.

The media conversion application 205 might then use the content interface 215 to access a content source (which might by an NPVR 125). The content source will obtain and/or provide the desired program. Merely by way of example, if an NPVR 125 is the content source, it might tune to the channel where the content will be received and/or store the program on a content store. (Alternatively, as described in detail below, the NPVR 125 might determine that it already has received and stored the program and thus might simply retrieve the program from a content store, as described in more detail below.)

When the program is available, the content source might transmit a message to the content interface 215, and the content interface 215 could then obtain the program from the content source. (Alternatively, the program itself might be transmitted by the content source to the content interface 215). Upon receiving the program, the content interface 215 might provide it to the media conversion application 205, which will convert the program into the proper format for the selected device. (In this example, for instance, the program will be converted to a format the PDA can read and display properly.) Once converted, the program can be provided (e.g., by the subscriber interface 220) to the desired device (perhaps via an NPVR, a subscriber connectivity device, etc.; by direct communication—via IP, etc.—with the device and/or the like). Optionally, the subscriber interface 220 may provide an alert (via electronic mail, SMS message, phone call, web page, etc.) to notify the subscriber that the download is complete.

In some cases, the MCS 120 (and/or another component of the system 100) might provide the ability to provide content to others as well. Merely by way of example, a depot (such as a web page, FTP site, etc.) might be provided (perhaps with appropriate security, such as password restrictions, etc.) to allow associates (e.g., family members, friends, etc.) of the subscriber to obtain (via download, electronic mail, etc.) content provided and/or selected by a subscriber. In an exemplary embodiment, for instance, an associate of the subscriber might log on to a web page provided by the MCS 120 (and/or other system component) and be presented with a list of content. The associate might then be allowed to select a desired format (and/or device), and the MCS 120 might then convert the content (as necessary) and provide it to the associate in the appropriate format/resolution (using, for example, any of the procedures described above, such as electronic mail, web page, direct transmission, etc.).

Figure 3:
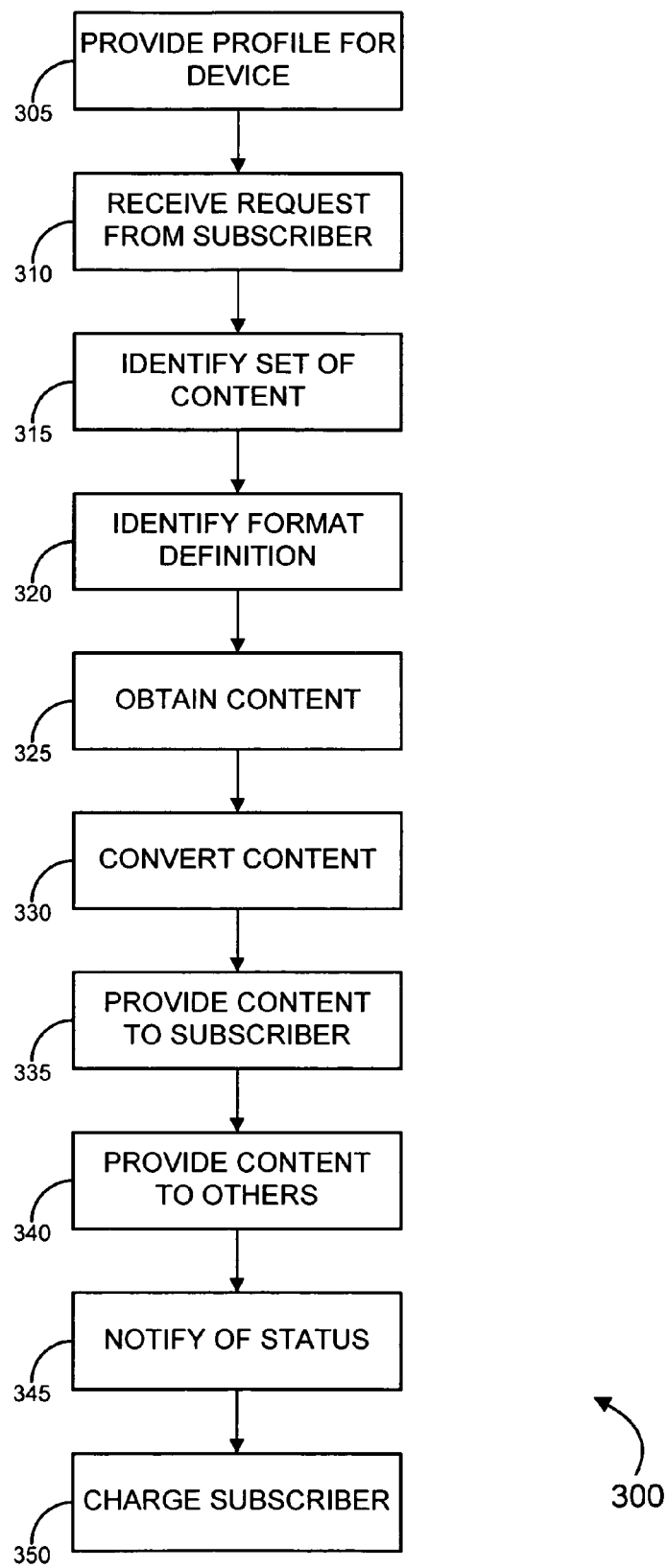
FIG. 3 is a process flow diagram illustrating a method of providing media conversion services in accordance with embodiments of the invention.

While the above example illustrates the operation of an exemplary MCS in a particular scenario, FIG. 3 provides a process flow diagram illustrating a generalized method 300 of providing media conversion services in accordance with other embodiments of the invention. At block 305, a device profile may be provided for one or more subscriber devices. Alternatively or additionally, subscriber preferences may also be provided. In a set of embodiments, such preferences and/or profiles may be stored, maintained and/or provided by a profile engine, as described above, for example.

Figure 4A:
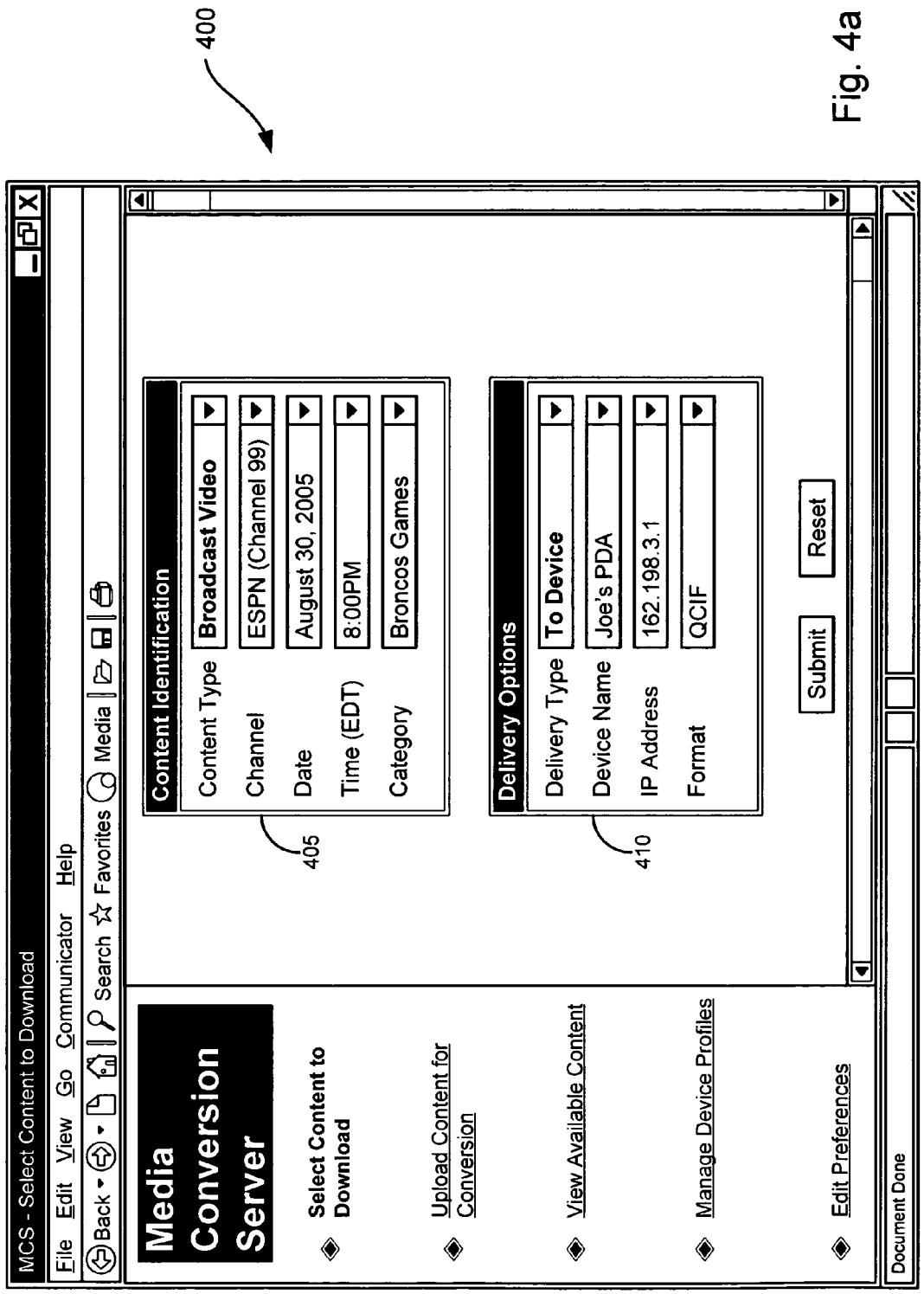
FIGS. 4a-4c illustrate exemplary screen displays in accordance with embodiments of the invention.

At block 310, a content request may be received from a subscriber. As noted above, there are various ways in which a content request may be received, e.g., via a web page, via electronic mail, via a subscriber connectivity device, etc. The content request may (but also may not) identify a device (perhaps by reference to a set of content to be converted (and/or provided to the subscriber) is then identified (block 315). FIG. 4a illustrates an exemplary screen display 400 of a web page that may be used to allow a subscriber to submit a content request. The web page may provide a content identification window 405, which can allow the subscriber to identify the content to be converted, including, merely by way of example, the source (which, in the exemplary display 400 is "broadcast video"), as well, perhaps as specific options that relate to that content source (in this case, channel and date/time information).

In a particular set of embodiments, the subscriber may be allowed to define categories of content. Categories may be used to auto-profile content, such that for example, all content of a particular category is converted to a particular format, downloaded to a particular device (or set of devices) etc. Categories can also be used to enable the system to "autoselect" content that the subscriber likely would enjoy. Thus, for example, if the subscriber has defined a category for movies starring a particular actor, the system can automatically convert and/or provide content in this category.

The web page may also allow the subscriber to specify various delivery options 410 (including, in this example, but not limited to, the type of delivery—e.g., to a device, by email, download, etc.), the device name, identifier, etc., as well, perhaps as a format for the content. It should be appreciated that, in some cases, the device name may be provided by the web page from among one or more devices for which profiles have been established. In such cases, default values for the other information (identifier, format, etc.) may be pre-selected for the subscriber (perhaps based on the device profile). Optionally, the subscriber may be given the option to modify the default values.

In a set of embodiments (as illustrated on FIG. 4*a*, for example), the content request may comprise sufficient information to allow the identification of the set of content to be converted/delivered. In other embodiments, (such as when no content request is received and/or the content request contains insufficient information to identify a particular set of content for conversion/delivery), other procedures may be used to identify the set of content to be downloaded. Merely by way of example, in some embodiments, the subscriber may have a standing request for a certain type of content (e.g., action movies starring a particular actor, music from a particular recording artist, etc.), and as such content becomes available, it may be identified (perhaps by an NPVR, etc.). In yet other embodiments, content may be identified automatically, perhaps based on similarities to other content (e.g., type of content, actors, producers, artists, etc.) previously requested by subscriber. Based on the disclosure herein, one skilled in the art will appreciate that there are a variety of procedures by which content may be identified.

Returning to FIG. 3, at block 325, a format definition for the request content is identified. In a set of embodiments, for example as described above, a profile for a particular device may be consulted to identify the appropriate format definition for that device. In other embodiments, other procedures may be used to identify the appropriate format definitions. Merely by way of example, the content request, as opposed to (or in addition to) specifying a device for delivery of the content, may specify a format in which the content is to be delivered and/or provided. (In such cases, the content may be—but need not necessarily be—stored, e.g., at an NPVR and/or content library for acquisition—by download, electronic mail, etc.—by the subscriber, such that the subscriber can manually deliver the content to the desired device. In this way, the subscriber may not need to specify a particular device for delivery of the content at the time of making the content request.)

Figure 4B:
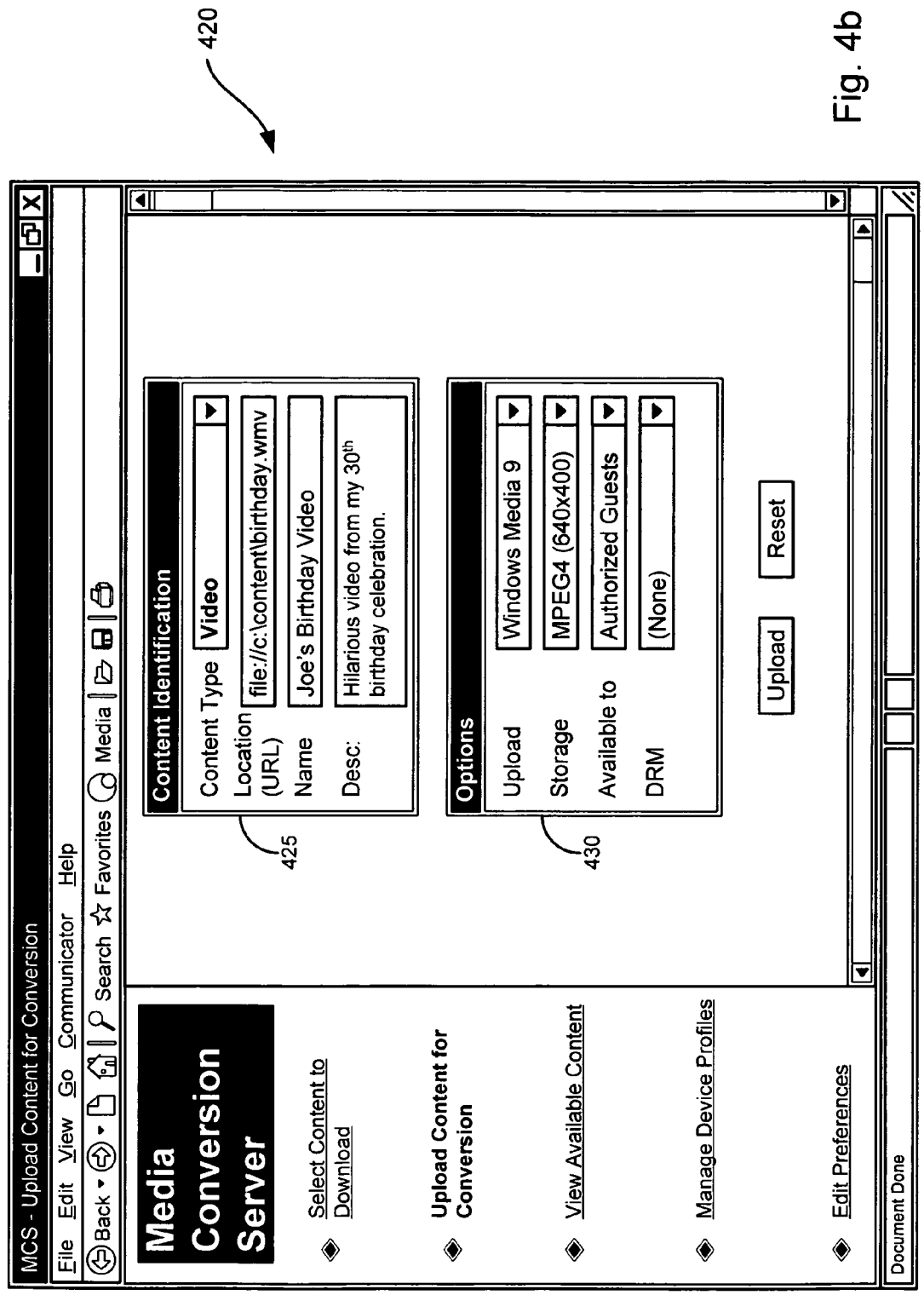

At block 325, the content to be converted and/or provided is obtained, usually from a content source. Various ways in which content may be obtained are described above. As noted above, one way in which content may be obtained is to allow the subscriber (and/or another to upload content to be converted, and one possible method of allowing the upload of content is via a web page. FIG. 4*b* illustrates an exemplary screen display 420 of a web page that can allow a subscriber (and/or another to upload content). The web page may provide a window 425 for the user to specify various information (including content location, such as via a URL, content name and/or description, etc.), as well as a window 430 to describe various options related to the content (such as the upload format—that is, the format in which the MSC should expect the content to be uploaded—the storage and/or download format, the users to whom the content should be made available, and/or any digital rights management options to be applied to the content). As another example, content may be obtained from an NPVR and/or from another content source (such as a video broadcast, etc).

Figure 4C:
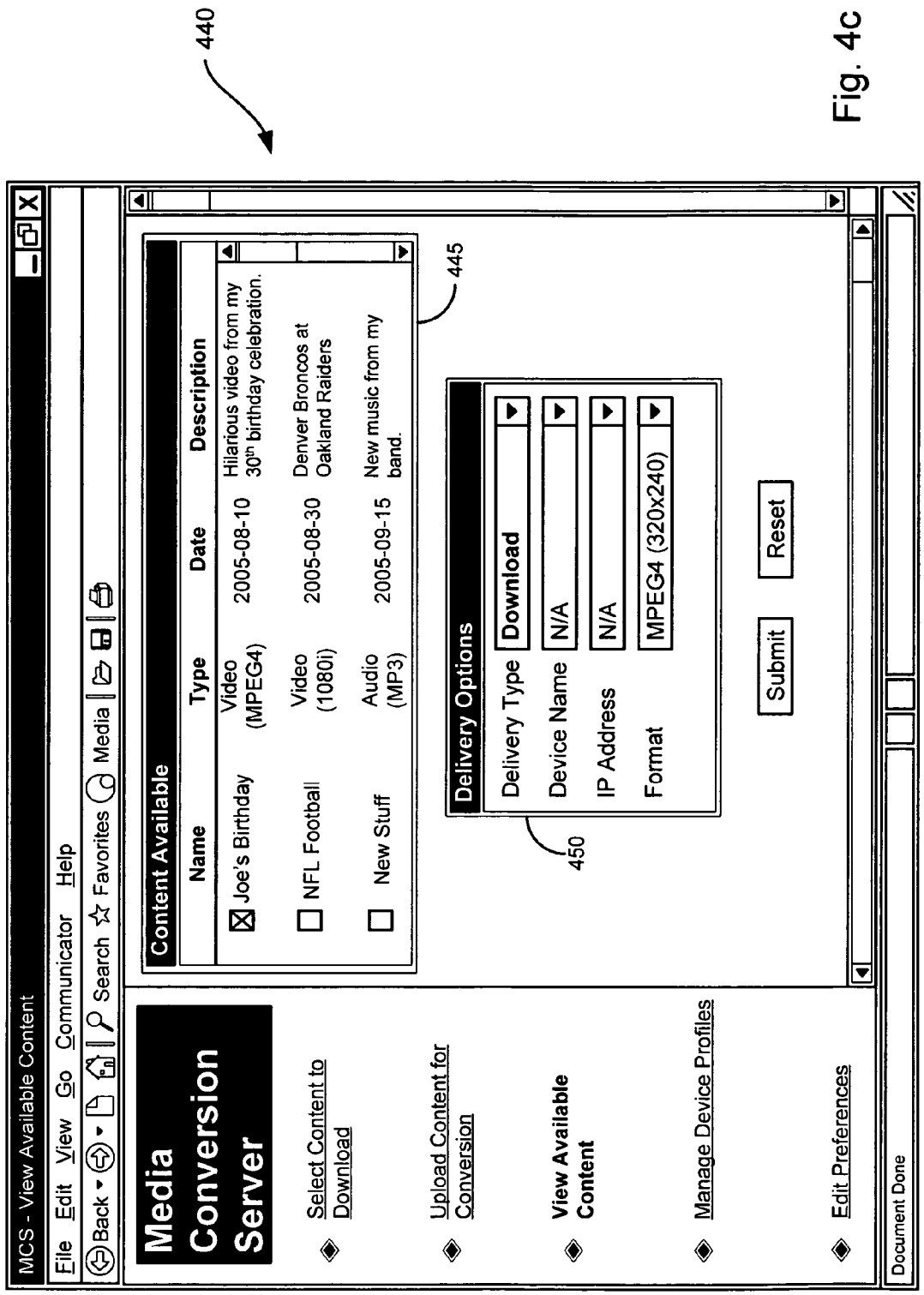

Returning again to FIG. 3, the obtained content may then be converted (block 330), perhaps as described above, and/or provided/delivered to the subscriber (block 335). Providing and/or delivering the content to the subscriber may take any of several forms, including without limitation those described in detail above. Merely by way of example, in a set of embodiments, the content may be transmitted to an NPVR for download by the subscriber, to a subscriber connectivity device, directly to a subscriber device, etc. In another set of embodiments, as mentioned above, the content may be provided via a URL and/or RSS feed (e.g., on a web page, etc.), via electronic mail, etc. FIG. 4*c* illustrates an exemplary screen display 440 that may be used to allow a subscriber to view available content (which may comprise content that has previously been selected for delivery and/or conversion). The web page may include a window 445 that lists (and/or allows the user to select) various content, as well as, in some cases, a window 450 that allows the user to identify options (such as the delivery type, format, etc.) for the delivery of the content.

In a particular set of embodiments, the content may be provided to others as well (or as an alternative to providing the content to the subscriber) (block 340), perhaps using one (or more) of the delivery methods described above. (In particular, a web page such as that depicted by FIG. 4*c* may be made available to authorized users to request delivery of the content.) In some cases, as noted above the content may need to be converted into additional format(s) for use by others.

As noted above, in some cases, the content may not be immediately transferred to a subscriber device. Merely by way of example, in certain embodiments, converted content may be stored (e.g., at a networked content store, an NPVR, etc.), such that the subscriber may access and/or download the content when desired (and/or the content may be downloaded later according to a schedule defined, for example, by the subscriber's preferences). Hence, it may be useful to notify the subscriber (and/or another) of the status of the conversion process (block 345). Examples include a notification that the conversion successfully completed, so that, for example, the subscriber is aware that she can access/download the content when desired, a notification that the conversion failed, so that, for example, the subscriber can re-initiate the conversion process if desired, and/or a notification that the conversion is pending. Other types of status notification are possible as well.

In accordance with embodiments of the invention, there may be a fee associated with conversion services. The fee may be a subscription-based fee (such as a monthly fee, etc.) and/or may be billed on a per-conversion basis. In some cases, the fee may comprise a licensing fee related to the content and/or a service charge for the conversion service itself. Hence, after a conversion has successfully been performed, the subscriber may be charged a fee for the conversion (block 350) (if, for example, the system is configured with a per-conversion fee). There are a wide variety of billing methods known in the art, and any of them may be used as appropriate. Merely by way of example, the subscriber's profile might include a credit card number, and/or the subscriber may be asked to provide a credit card number upon requesting a conversion, such that the credit card may be billed the conversion fee. Alternatively, if the subscriber has a monthly billing relationship with the provider of conversion services, the fee may be added to a monthly invoice, etc. Other forms of payment, including for example, e-cash, direct debit, and/or the like, may be used as well.

The notification can take any suitable form, including those described elsewhere herein. Merely by way of example, the notification may comprise an email message; a SMS message; an instant message; a voice mail; a pop-up window (or other similar notification) on the subscriber's PC, television, etc.; and/or the like. Like other features, whether notification should occur (and the type of notification) may be defined by subscriber preferences and/or stored in a subscriber profile.

3. Real-Time On-Demand Server

As noted above, certain embodiments of the invention provide solutions that allow the incorporation of real-time information in an on-demand environment. A set of embodiments thus provides a ROD server to allow the incorporation of such information. (It should be noted that, while FIG. 1 illustrates a ROD server 130 in communication with an NPVR 125 and/or an MCS 120, it should be appreciated, as noted above, that various of these devices may be combined in a variety of manners, and/or various functions of such devices may be divided in any appropriate manner. Merely by way of example, in some cases, a ROD server 130 may be integrated with an NPVR 125 and/or MCS 120.

The ROD server 130, then, may be configured to provide real-time information (which should be understood to include near-real-time information as well) to a subscriber, especially in an on-demand environment. Real-time information can include, inter alia, video, audio, text, pictures (and/or any combination of these), as well as any other appropriate data. In a set of embodiments, real-time information comprises any cyclical information and/or information that can be expected to change, expire and/or be refreshed on a somewhat regular basis. Examples of real-time information thus include things like traffic reports, news and/or weather reports, sports scores, securities quotes (and/or related information), etc. Advertising inserts (such as commercials, etc.) can also be considered a type of real-time information that may be accommodated by particular embodiments of the invention.

Previously, if a subscriber in an on-demand environment wished to obtain real-time information, the subscriber would either have to leave the on-demand environment (e.g., tune to a real-time channel). Another option might be to request on-demand a set of real-time content, such as a news broadcast, which might be recorded for later viewing. In neither case, however, could such real-time content be provided as an integral part of the on-demand environment.

In a set of embodiments, then, a ROD server may be configured to receive real-time data via analog and/or digital sources and/or make this information available to subscribers. A ROD server thus may complement (and/or be integrated with) an NPVR in that the ROD server can provide the real-time information a user would get from a broadcaster and make it available in an on demand environment. Hence, the subscriber will have access to data as it becomes available and will not be forced to watch "out dated" information. For example, the ROD server may provide access to the latest news, weather, sports scores, etc., perhaps on an automatically-updated basis. Merely by way of example, the subscriber may be given the option (perhaps through a subscriber interface, as described in detail below) and requesting traffic and/or weather conditions for the subscriber's area; such reports may be updated constantly and/or periodically as appropriate. In an embodiment, the ROD server would continually update this data and/or the user could select a hyperlink, etc. to view the content. In addition, the user can setup automatic alerts on condition of content change. For example, a user could have a pop up window on a subscriber device (such as a television, for example) that has the latest weather update or road conditions.

Figure 5:
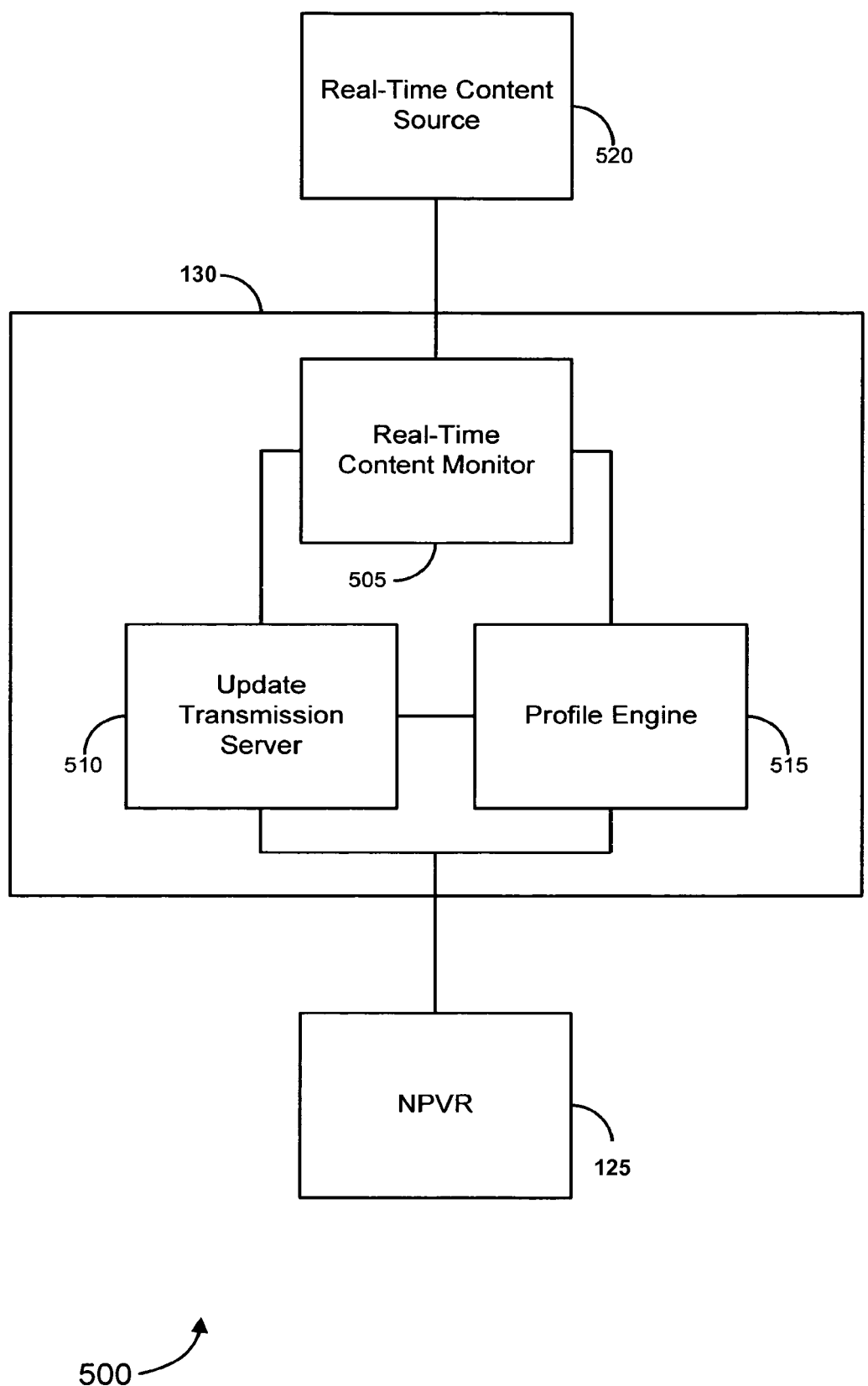
FIG. 5 is a functional diagram illustrating a real-time on-demand server in accordance with embodiments of the invention.

The ROD server, in some embodiments, can be used in conjunction with NPVR, audio, or video library server, or a server for other types of media, to provide real time data to subscribers. The ROD server may communicate with other server(s) and/or device(s) by means of a wire-line, wireless or other type of network. FIG. 5 illustrates a functional diagram of an exemplary system 500 employing a ROD server (which may be a ROD server 130 as illustrated in FIG. 1). In the system 500 illustrated by FIG. 5, the ROD server 130 comprises several functional components, each of which may comprise hardware, software and/or a combination of each.

The first component, a real-time content monitor 505, may be configured to monitor one or more sources of real-time content 520 (which may include broadcast feeds, various web and/or content servers, etc.). In a set of embodiments, one source of real-time content may be an urgent public information distribution system, several of which are described more fully in the following applications, each of which is incorporated herein by reference: U.S. patent application Ser. No. 10/676,418, filed Sep. 30, 2003 by Phillips et al. and entitled "Methods, Systems and Apparatus for Providing Urgent Public Information"; U.S. patent application Ser. No. 10/854,738, filed May 25, 2004 by Phillips et al. and entitled "Alert Gateway, Systems and Methods,"; and U.S. patent application Ser. No. 10/676,429, filed Sep. 30, 2003 by Phillips et al. and entitled "Methods, Systems and Apparatus for Selectively Distributing Urgent Public Information."

The real-time content monitor 505 may be configured to monitor and/or access real-time information in a variety of ways (often depending on how the content source 520 is configured to provide such information). Merely by way of example, in some cases, the real-time content monitor 505 may be configured to access information manually (e.g., at the request of a subscriber for updated information), via a schedule (e.g., recording local news broadcasts at the time(s) those broadcasts normally are aired) and/or via content update notification technologies such as RSS feeds, electronic program guides, etc. to determine whether new content is available. When new content is available, the real-time content monitor 505 may notify an update transmission server 510 that such content is available. Such notification may comprise a URL and/or RSS feed to the updated information, and/or some other reference to the updated information (such as a message, which may be XML, RSS, etc. that indicates, for example, a broadcast channel and/or time at which the new content is available). Merely by way of example, as described in more detail below, a subscriber's personal broadcast channel might comprise an RSS feed comprising real-time content tags that the subscriber wishes to access.

In the system exemplified by FIG. 5, the updated transmission server 510 is configured, perhaps upon notification from the real-time content monitor 505, to obtain a set of new and/or updated real-time content. In some cases (as illustrated by FIG. 5, for example) the real-time content monitor 505 may serve as an interface between the update transmission server 510 and the content source(s) 520. In other cases, the update transmission server 510 may communicate directly with the content source(s) 520 and/or may communicate via other interfaces (including antenna interfaces, satellite interfaces, television tuners, etc.). In a set of embodiments, update transmission server 510 may also interface with an NPVR 125, e.g., to store real-time content, to provide real-time content, etc. In a particular set of embodiments, the update transmission server 510 may be in communication with a MCS (either directly and/or via an NPVR 125, through another device, etc.), such that any updated content may be converted for display/usage as desired by the subscriber.

In some cases, subscriber profiles and/or preferences may be used to enable the ROD server 130 to determine what real-time content should be monitored/provided, on which devices certain content should be provided, etc. Merely by way of example, one or more subscriber profiles may dictate that updated stock quotes should be provided to the subscriber's PDA every 15 minutes, that updated local news should be made available for viewing on the subscriber's television every night at midnight, that updated traffic reports should be provided to the subscriber's wireless phone every 5 minutes between the hours of 7:00-9:00 am and 4:00-6:00 pm, etc.

Hence, in some embodiments, the ROD server 130 may include a profile engine 515, which may be in communication with the content monitor 505, the update transmission server 510, an NPVR 125 etc. (In some cases, the ROD server may utilize a profile engine of an MCS and/or a NPVR, as described elsewhere herein. In other cases, a profile engine may be provided on a separate server for use by all system devices, etc.) The profile engine 515, then can allow a subscriber to store and/or manage profiles. The profile engine 515 may also be configured to instruct the real-time content monitor 505 to check for new/updated content (e.g., on a schedule specified by a profile), and/or the profile engine 515 may be configured to instruct the update transmission server 510 and/or NPVR 125 of the device(s) to which certain real-time content should be provided and/or the format(s) in which such content should be provided. The ROD server 130 and/or the NPVR 125 then may provide the content to an MCS 120, as appropriate, to be converted and/or provided to the subscriber (of course, as detailed elsewhere herein, the MCS 120 may convert the content and then provide the converted content to an NPVR 125 and/or other device for delivery to the subscriber's device(s)).

The subscriber's profile may also be used to determine how various sets of real-time content are to be delivered to the subscriber. Merely by way of example, some types of content may be provided on demand by the subscriber (e.g., on the subscriber's television screen—on a fall screen display, in a picture-in-picture window, etc.—on a web page on the subscriber's computer display, etc.). Other types of content (including, merely by way of example, relatively urgent content such as emergency alerts, weather alerts, etc.) may be displayed in an automatically generated (pop-up) window on a computer display and/or television screen, as an email and/or text message, etc. In other cases, the subscriber device may determine how content is to be displayed.

Merely by way of example, in a set of embodiments, the ROD server 130 may comprise a subscriber interface (which is not illustrated in FIG. 5 but which may be similar to the subscriber interfaces described above). In some embodiments, a single subscriber interface (and/or set of subscriber interfaces) may be used to provide subscriber communication for the MCS 120, ROD server 130 and/or NPVR 125. Hence, in a set of embodiments, the update transmission server 510 may send a notification to a subscriber interface, which may be a component of the MCS 120, NPVR 125 and/or ROD server 130 that new data is available. The subscriber interface may forward, for example, RSS data to one or more subscriber devices 145 and/or subscriber connectivity devices 140 that have requested updates to this content. Based on the content of the RSS feed, the subscriber device 145 and/or subscriber connectivity device 140 may determine how content is delivered to the subscriber.

As described above, the subscriber interface may provide a web interface and/or email interface, which could, for example, allow a subscriber to create and/or manage profiles for various types of real-time content. As noted in more detail below, some embodiments of the invention provide on-demand schedules, such that a plurality of sets of on-demand content can be scheduled for viewing (and/or listening, etc.). Certain embodiments, then, may provide "windows" in this on demand schedule, into which real-time content may be inserted. In a set of embodiments, a subscriber's profiles and/or preferences may be used to determine what type of on-demand content should be inserted into such windows, as well as when such windows might occur. In such cases, for example, the profile engine 515 may indicate to an NPVR 125 where the real-time content is to be inserted into a stream of on-demand content.

Figure 6:
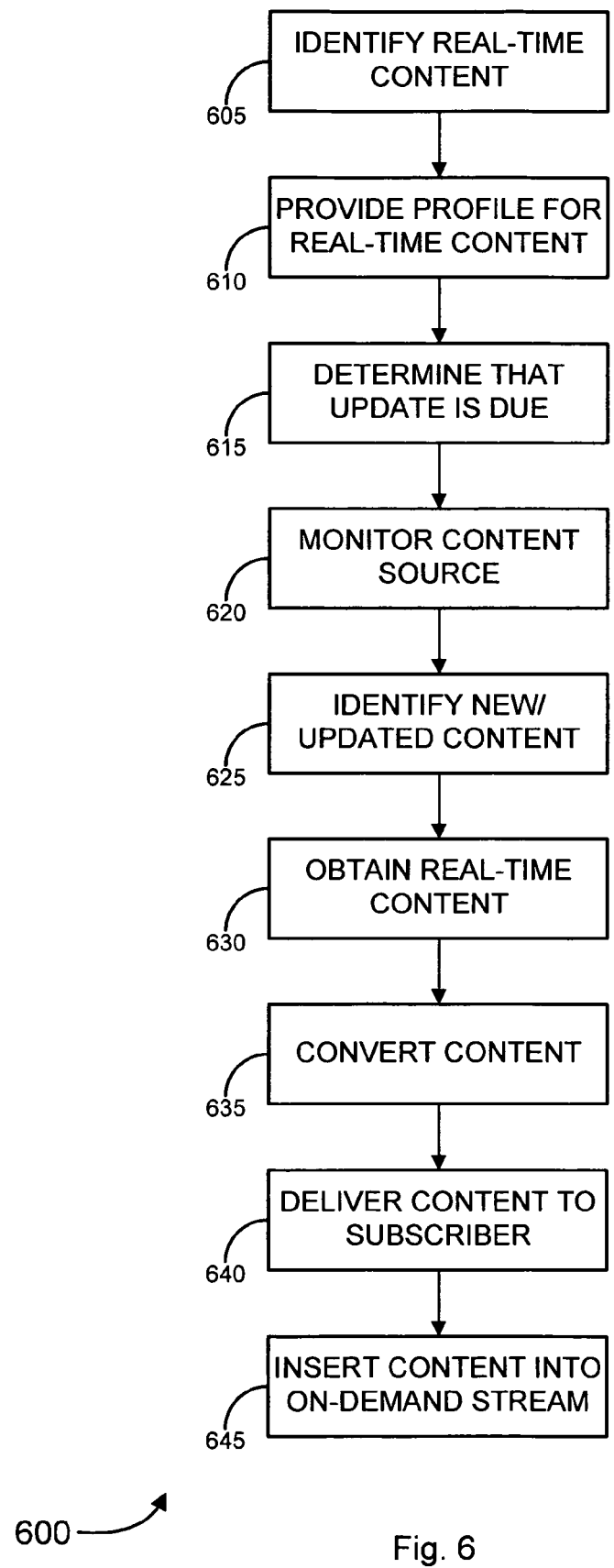
FIG. 6 is a process flow diagram illustrating a method of providing real-time content in accordance with embodiments of the invention.

FIG. 6 illustrates a process flow diagram of an exemplary method 600 for providing real-time content to subscribers. The method 600 may be (but need not be) implemented by a ROD server such as that depicted by FIG. 5. At block 605, a set of real-time content may be identified (e.g., by a subscriber). Real-time content can include any of the types of content described herein, including without limitation video, audio, still pictures, text, HTML, URLs, rich Internet content, etc. In some cases, a web interface may be provided to allow the subscriber to select the type(s) of real-time content that the subscriber would like to have provided. In other cases, the subscriber may identify real-time content when viewing the content, for example by tagging the content (e.g., selecting an option, via PC interface, remote control, etc.) as content that the subscriber would like to have updated (e.g., whenever updates are available).

In a set of embodiments, a profile may be provided for the set of real-time content (block 610). The profile may include, without limitation, an identifier of the content (such as a name, etc.), a reference to a source of the content (such as a channel listing, URL, etc.), etc. The profile may also include information about when content expires, when content should be updated/refreshed, etc. So, for example, with respect to a particular set of real-time content, the profile could indicate that the content expires after a set duration (perhaps twenty minutes for a traffic report, three hours for a weather report, etc.). Alternatively (or additionally), the profile may specify that content should be refreshed (if updates are available), e.g., on a particular interval; if there is no update available, the current content does not expire, but if there is an update available, it may replace the current content. Other options may be specified in the profile as well, including for example, one or more default devices to which real-time content should be provided, at what point in a content stream a particular set of real-time content should be provided, how a particular set of real-time content should be converted, etc. As described below, the real-time content may be inserted into an on-demand content stream, and the profile may define whether and when this should occur. As described in further detail below, the profile may also be used to support and/or facilitate advertising services.

In a set of embodiments, profiles can also determine presentation options for content. Merely by way of example, a subscriber's profile might provide for a option that highlights embedded links in content. With the option off, the user would not be provided with any indication that content included embedded links and therefore perhaps would have to select (e.g., mouse over) an area of content (such as an image) to find the link. For example, in a movie the main character is always wearing a particular hat. The viewer likes the hat and wonders if there is an associated advertising link. So user selects the hat by moving a cursor or other indicator over the hat. As the user does so, a link appears, and the user is able to follow the link to the advertising. Alternatively, if the profile indicates that the link option is on, all links become visible so that the user can see which links are available. This way, it is easy for a user to pursue embedding links or turn them of while viewing content.

Other content presentation options are possible as well. Merely by way of example, a subscriber could be provided with a profile option that would allow the subscriber to define which embedded links could be followed. For instance, embedded links (and/or the content to which they refer) might be rated, using any of several content rating systems available (such as MPAA ratings, to name one example), and subscribers could be given the option to define which ratings would be allowed as links. Hence, content with a rating above a certain level (such as PG), content with certain attributes (such as violence) and/or unrated content, would not be available as embedded links, for example, by removing the embedded link from the content, by disabling the link, etc.

In a set of embodiments, options may be selected "on-the-fly" using, for example, a remote in communication with a set-top box. In other embodiments, such options may be selected via a web page and/or other interface to the system.

As noted above, a single profile may be provided for a variety of services (including without limitation, media conversion services, as described above, and/or real-time on demand services, as described here). Merely by way of example, profile information may be shared between services (for example, a single profile may identify a set of real-time content as well as define default conversion options for that content).

At block 615, the system determines that an update is due. This determination may be made by an automated process that periodically (and/or constantly) monitors profiles for various sets of content; at an interval specified by a profile, the process may determine that an update is due. In other cases, a particular set of content may have an expiry date and/or time associated therewith (e.g., the set of content may be tagged with an expiry date/time), and determining that an update is due may comprise examining such expiry information for a particular set of content.

In some embodiments, a source of real-time (and/or other) content may be monitored (block 620) and/or new/updated content can be identified (block 625). These two procedures often may be performed in conjunction with one another. Merely by way of example, monitoring a source of content may comprise inquiring of the content source whether any new or updated content of interest is available, and identifying new/updated content may comprise receiving a response to the inquiry and/or analyzing such a response to determine whether new/updated content is in fact available.

In some cases, these procedures may be performed in response to a determination that an update is due for a particular set of content. In other cases, the process may be performed in lieu of such a determination and/or may assist in such a determination. Merely by way of example, a particular set of content may not have a set expiry date/time or update frequency (as might be established in a profile and/or stored in a tag associated with the content, as described above, for example), and/or the source of that content may be monitored (constantly, periodically, etc.), such that when content source indicates that updated content is available, the updated content can be obtained.

Monitoring a content source can be a passive and/or active process, depending on the process the content source uses to publish new content. Merely by way of example, a content source may distribute a feed (such as an RSS feed, broadcast feed, etc.) that indicates when new and/or updated content is available. In such cases, monitoring the content source may comprise subscribing to the RSS feed, such that the system is notified via RSS when new and/or updated content becomes available; identifying new/updated content may comprise receiving and/or analyzing new entries in the RSS feed to determine whether they indicate new/updated content that should be obtained.

As another example, a content source may provide content for download (via HTTP, FTP, etc.) and/or monitoring the content source may comprise an automated process performing an appropriate procedure (several of which are known in the art) for checking the download site (perhaps on an interval determined by the profile for that content, etc.); identifying the new/updated content, then, may comprise determining whether new and/or updated content is available for download. Merely by way of example, if a particular set of content is available for download with a given file name, the monitoring/identification process might periodically check to determine whether that file has changed (e.g., using any of a variety of consistency-checking procedures, such as CRC checking, timestamp checking, file size comparisons, MD5 hash checking, etc.). In other cases, the content source may implement file names that include time/date information, and the monitoring/identification process may analyze the file name(s) of content available from the content source to determine whether new/updated content is available.

At block 620, content (including without limitation, real-time content) may be obtained. There are a variety of ways known in the art to obtain content, and any appropriate way may be used in accordance with various embodiments of the invention. As can be appreciated, the process of obtaining content, like that of monitoring a content source, often will depend on the type of content and/or content source. Merely by way of example, if the content is available via download, obtaining the content may comprise downloading the content. As another example, in some cases, the content may be available through a broadcast, and/or obtaining the content may comprise receiving the broadcast content. In certain embodiments, obtaining the content may comprise transmitting a request to the content source (and/or a maintainer thereof) to request transmission of the content. In some cases, obtaining the content can further comprise storing the content, e.g., locally at a subscriber connectivity device and/or subscriber device, at an NPVR, at a networked content store, etc.). In some cases, obtaining the content might comprise accessing the content at a local device and/or from a personal broadcast channel, as described in further detail below, for example.

In some cases, it may be necessary to convert the obtained content (block 635). Whether conversion is necessary (and the type of conversion necessary) often will depend on the format of the obtained content and/or the device(s) on which the set of content is intended to be used. As noted above, the conversion options (type of conversion, timing of conversion, etc.) for a particular set of content may be determined by a profile for the content and/or a profile for a device on which the content is to be used. In many embodiments, a media conversion server may be used to perform conversion services, and/or the conversion process may proceed as described above.

The set of content then may be provided to the subscriber (block 640). In many cases, the profile for a particular set of content and/or device (as described above) may be used to determine how a set of content is delivered. Further, how content is provided to the subscriber often will depend on the type of content and/or the device(s) on which the content is to be delivered. Merely by way of example, a profile for a set of content comprising a traffic report might indicate that the traffic report should be delivered to the subscriber's wireless phone (perhaps as an SMS message) when available during rush hour. In some cases, providing the content to the subscriber might comprise transmitting a notification to a subscriber. Merely by way of example, for an updated weather report, a notification might be transmitted for display (as a banner, window, etc.) on a television, PC, etc. The subscriber then could be given the option of choosing to view the content (e.g., by selecting a banner with a remote via a set-top box, by selecting a hyperlink, etc.).

In a certain set of embodiments, providing the content to the subscriber may comprise inserting the content into an on-demand stream (block 645). As described in more detail below, certain embodiments of the invention allow for the creation of on-demand streams, including without limitation personal broadcast channels. In some embodiments, therefore, an on-demand stream may comprise windows for the insertion of real-time content (and/or a window may be created as necessary). For instance, if a subscriber defines a real-time content stream to include a news block at 10:00 PM, a current (e.g., new, updated, etc.) set of news content may be stored and/or scheduled for this window, such that the real-time content will be viewed as part of the subscriber's selected programming schedule.

The systems and methods used to provide real-time content may also (or alternatively) be used to deliver advertising in an on-demand stream. In such cases, a profile may indicate the type of advertising that the subscriber would be interested in seeing (based either on preferences explicitly selected by the subscriber and/or on the subscriber's viewing habits, etc.). In some cases, each stream of on-demand content may be required to include a certain amount of advertising content (e.g., to finance the on-demand services, either partially or wholly). Methods and systems of the invention, can allow the subscriber to choose when such advertisements are presented, and/or the type of advertisements presented. (Alternatively, the subscriber might not be allowed to specify either of these options—in such cases, the system might simply schedule advertisements at particular intervals).

As another example, a stream of real-time or non-real-time advertising content may be inserted. An advertiser could use a profile to define how the content is to be inserted (for example, an expiration tag could be used to define a date/time after which the advertising content should not be inserted. The system might provide an interface (such as those described above, for example) to allow an advertiser to configure the profile for a particular set of advertising. For instance, an advertiser might purchase a week's worth of advertising (at a special rate, etc.), and the profile would define the week during which the advertising would run. (The system might be configured to impose controls on the advertiser's configuration of the profile, such that, for example, if a week's worth of advertising were purchased, the advertiser could not configure the profile to allow for more than a week during which the advertising content would run.) Other options could be provided to allow the advertiser to define, for example, the type of content (sports, movies, etc.) the advertisement should be inserted into and/or the demographic (by age, sex, etc.) the advertisement should be shown to.

4. Networked Content Storage

Another set of embodiments provides for networked content storage. Networked content storage allows for the service provider and/or the user to store or have access to content stored on the network. (Of course, where appropriate copyright controls, including, for example, digital rights management ("DRM") schemes may be implemented. In a set of embodiments, a caching system may provide for multiple copies of a given set of content, to balance the competing concerns of efficient storage and efficient distribution of content. At one end of this spectrum, each subscriber would have a local copy of a set of content (stored, for example, on a server or PVR local to that subscriber). At the other end of the spectrum, a single copy of the set of content may be maintained at a central location, and each subscriber wishing to view the content might access (e.g., via streaming download, etc.) the copy from that central location. In accordance with embodiments, of the invention, either of these two extremes may be used, and/or caching systems may provide a middle ground. Hence, copies of a set of content may be centralized and/or distributed, based perhaps on efficiency and popularity.

In some embodiments, the number of copies minimize is minimized (ideally to a single copy). A subscriber, then, would be able to request access to the content when needed. As a result, it may appear to the subscriber that she has access to her own copy of the content, while in reality the subscriber merely accesses a shared copy. In some cases, a subscriber is given the ability (perhaps via a profile, similar to those described above) to personalize "her copy" of the content, such that the subscriber has the ability to edit the content, such as editing the content to remove adult language, violence, etc., delete scenes, add special effects, etc. A typical example might be a parent wanting his child to see parts of a movie that is rated "R" while preventing the viewing of objectionable pieces of the content. The profile would cause the display of content to skip over the objectionable scenes.

Content can be sourced by the service provider, uploaded by a user and/or otherwise obtained. Merely by way of example, a subscriber might choose to upload a set of content (such as a personal video of a child's baseball game, etc) to allow others to view that content. In such circumstances, the subscriber might configure a profile for the content that allows public viewing and/or restricts viewing to the subscriber himself and/or a selected set of viewers. Of course, in other cases, the service provider provides the content (which might be created by the provider and/or obtained from a studio, a network, etc. as in traditional provision of radio and television services).

Figure 7A:
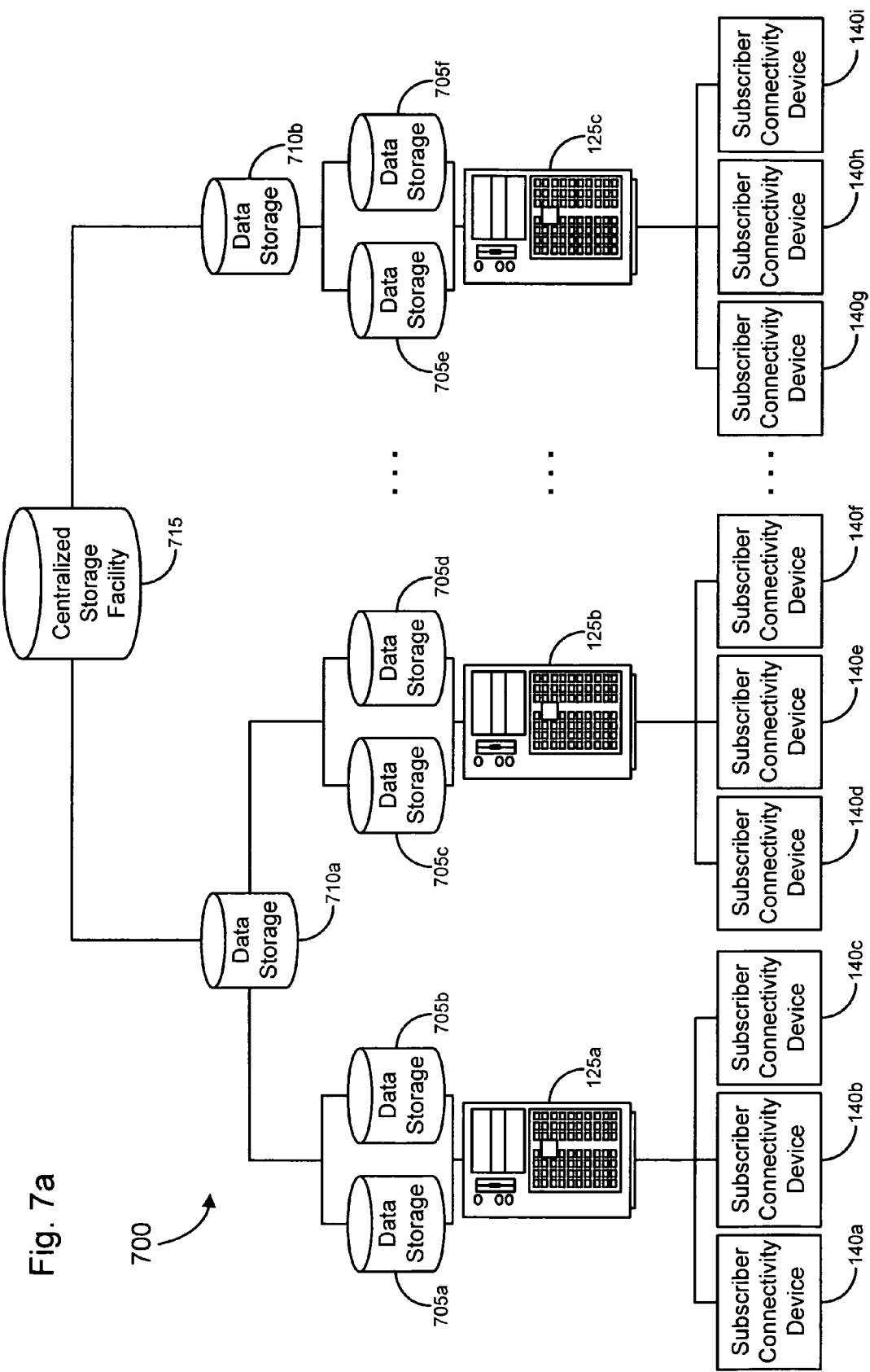
FIG. 7a illustrates a system capable of providing networked content storage, in accordance with embodiments of the invention.

Some embodiments may employ a storage area network ("SAN") to provide networked content storage. In a set of embodiments, a SAN (and/or any other arrangement of storage devices) may be configured provide networked content storage to providers. Merely by way of example, FIG. 7a illustrates a system 700 that can be used to provide networked content storage to a plurality of subscribers (e.g., via subscriber connectivity devices 140).

The system 700 includes a plurality of NPVRs 125 (although, in some embodiments, a single NPVR 125 may be used), along with a plurality of storage devices 705, 710 and 715. In some embodiments, the storage devices (each of which may comprise one or more storage media, such as optical disks, hard disk drives, RAID systems, SANs, etc.)

may be arranged in a hierarchy. In accordance with embodiments of the invention, a storage device 705, 710 and/or storage facility 715 may comprise not only one or more storage media (such as those described above), but also may comprise (and/or may be in communication with) processing devices, such as server computers, disk controllers, etc., that include software, hardware and/or firmware instructions for performing methods of the invention and/or related functionality. (In the case of a storage device 705 local to and/or associated with an NPVR 125, the NPVR 125 may provide such functionality.)

Figure 8:
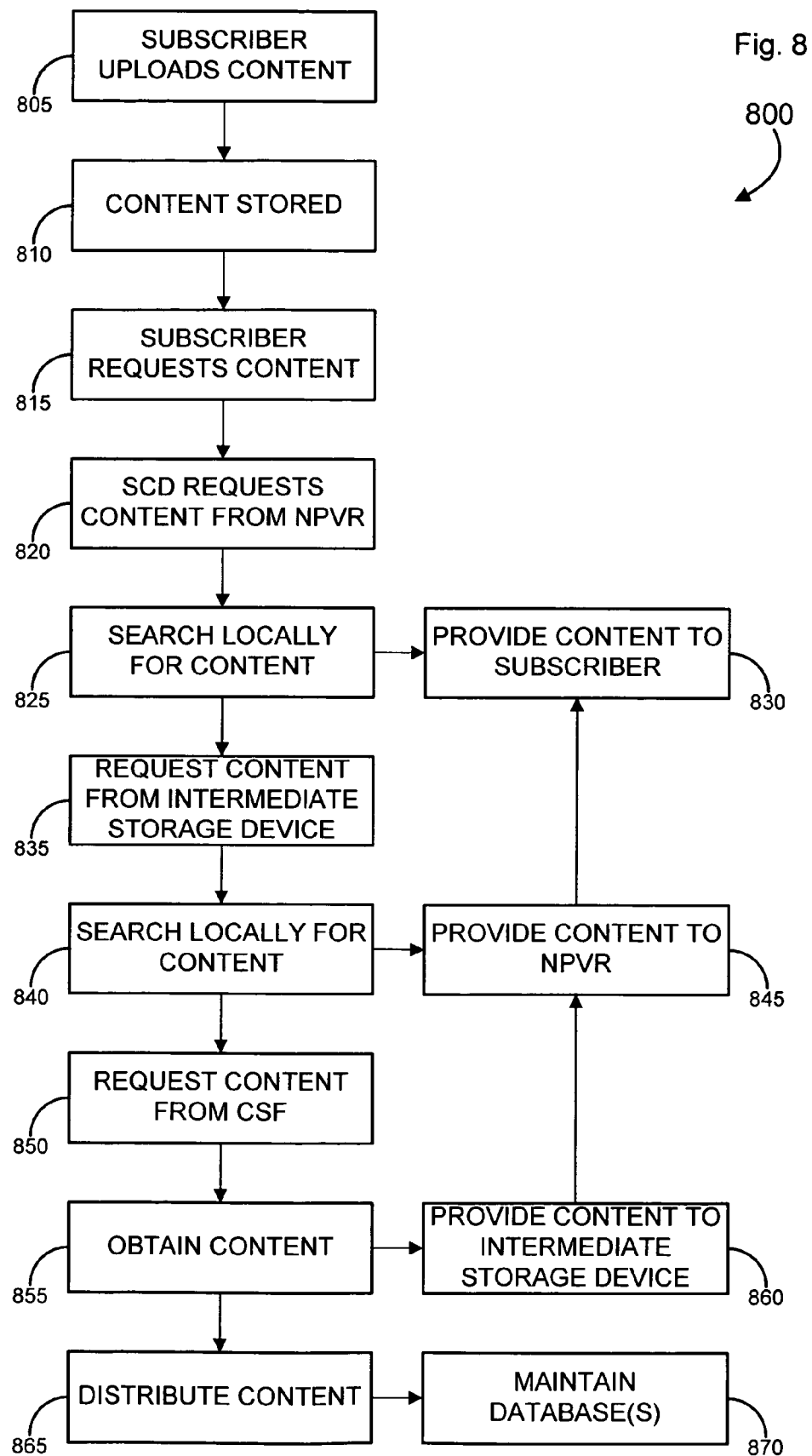
FIG. 8 is a method of providing networked content storage, in accordance with embodiments of the invention.

In the system 700, each NPVR 125 has one or more associated storage devices 705. Each of those storage devices 705 may be in communication with one or more intermediate storage devices 710, which, in turn, may be in communication with a centralized storage facility 715 (which may be associated with a centralized server). It should be noted that, while the system 700 of FIG. 7a is provided for illustrative purposes, other arrangements, both hierarchical and non-hierarchical may be implemented in accordance with other embodiments. In particular, while the system 700 of FIG. 7a illustrates three levels of hierarchy, it should be noted that relatively greater or fewer hierarchical levels may be provided in various embodiments. In addition, while the system 700 of FIG. 7a and the method 800 of FIG. 8 describe content requests made initially to an NPVR 125 in the network, it should be noted that, in some cases, the NPVR 125 may be local to a subscriber's location—e.g., the NPVR 125 may be incorporated within the subscriber connectivity device 140, etc.—and that the NPVR 125 therefore may be responsible for making content requests to other storage devices 705, 710 and/or facilities 715.

In a set of embodiments, content may be cached in a manner similar to the caching of domain records in the domain name system ("DNS"), whereby an NPVR 125a first looks to its local storage devices 705a, 705b for requested content. If the requested content is not found, the NPVR 125a requests the content from an appropriate intermediate storage device 710a. If that device 710a has a copy of the requested content, it will provide it to the NPVR 125a. If not, the intermediate storage device 710a (and/or a server associated therewith) may request the content from another attached NPVR 125b. Alternatively, the intermediate storage (and/or a server associated therewith) device may request the content from a centralized storage facility 715.

The centralized storage facility 715 may, in some cases, be an authoritative source for any given set of content, and thus may contain a master copy of all content available in the system 700. In other cases, however, various data storage devices (e.g., 705, 710) may include copies of content not available from the centralized storage facility 715. Hence, in some cases, the centralized storage facility 715 may maintain a database of various sets of available content, along with the particular storage device(s) from which that content is available.

Hence, if a set of content is requested from the centralized storage facility 715, the centralized storage facility 715 can either provide the content (either from its own local copy or by obtaining it from another data storage device) or provide a reference to another data storage device where the content is available. As an example of one aspect of the invention, therefore, consider the following scenario, which is illustrated by the method 800 of FIG. 8 and is described with respect to the system 700 of FIG. 7a (although other systems could be used as well).

In some embodiments, as noted above, a subscriber may be given the opportunity to upload content to an NPVR 125c, for example from a subscriber connectivity device 140i (block 805). At block 810, content (which may be the content uploaded by a user or any other content, such as they types of content described above) is stored. If the content is uploaded by the user, the content will, in accordance with some embodiments, always appear to (to the uploading subscriber) to be stored at the subscriber's NPVR (that is, the NPVR 125c that serves the subscriber connectivity device 140i, which might also serve a plurality of other subscribers). In reality, however, the content may be stored at one or more locations anywhere in the network of storage devices depicted on FIG. 7a, including without limitation a storage device 705f local to the NPVR 125c, an intermediate storage device 710 and/or a centralized storage facility. As described in further detail below, the determination of where to store the content may be implementation-specific, and/or it may depend on the use of the content.

Now assume that a subscriber associated with a subscriber connectivity device 140a wishes to consume a particular set of content (e.g., view the content uploaded in block 805, view a particular television program, hear a particular song, etc.). The subscriber then requests the content (block 815), e.g, by selecting the content from an electronic program guide on a television in communication with the subscriber connectivity device 140a, linking to the content from a computer (which may be in communication with the subscriber connectivity device 140a, or may in fact be the subscriber connectivity device 140a), etc.

The subscriber connectivity device 140a will issue a request (block 820) to the appropriate NPVR 125 (which generally will be the NPVR 125a serving the subscriber connectivity device 140a, and which may appear to the subscriber to be a PVR dedicated to that subscriber) for the content. The NPVR 125a generally (although not necessarily) will search for the content on its local storage device(s) 705a, 705b (block 825). If the NPVR 125a is able to find the content on a local storage device 705a or 705b, it will simply provide the content to the subscriber (block 830), for example, in the manner described above. (In some cases, the content may need to be converted, e.g., as described above, before it is provided to the subscriber.)

If, however, the NPVR 125a cannot find the content in local storage, it may request the content (block 835) from an appropriate intermediate storage device 710a (it should be noted that, while FIG. 7a illustrates each NPVR in communication with one intermediate storage device, in other embodiments, each NPVR may be in communication with a plurality of intermediate storage devices). The intermediate storage device 710a (and/or a server associated therewith) will determine whether it has a copy of the content (block 840). If the intermediate storage device 710a has a copy of the content, it will provide it to the NPVR 125a (block 845), for example as described in further detail below. The NPVR, in turn, might provide it to the subscriber connectivity device 140 (block 835).

If the content cannot be found on the intermediate storage device 710a, the intermediate storage device 710a and/or a server associated therewith (and/or, in some cases, the NPVR 125a) may issue a request to the centralized storage facility 715 for the content (block 850). (It should be recognized that, while for the sake of simplicity, only three levels of hierarchy—the centralized storage facility 715, the intermediate data storage devices 710 and the data storage devices 705 local to the NPVRs 125—have been illustrated on FIG. 7a, other embodiments may feature a plurality of levels of intermediate storage devices 710, a plurality of centralized storage facilities 715, etc.).

Depending on the embodiment, then, the centralized storage facility 715 may perform one or more of several actions to obtain the content (and or determine the location of the content) (block 855). For example, in some cases, the centralized storage facility 715 may have a copy (which might be a master copy, for example) of the content, and it obtaining the content thus may simply comprise determining that the centralized storage facility 715 does in fact have a copy of the content. If the centralized storage facility 715 does not have a copy of the content, obtaining the content may comprise searching a database for a location of the content and/or obtaining the content from a data source that does have a copy of the content. Such data sources can include, merely by way of example, another centralized storage facility and/or a producer/distributor of the content. Further examples of such data sources can include one or more intermediate data storage devices (e.g., 710b, 710c) and or one or more data storage devices (e.g., 705c, 705e) local to other NPVRs.

In some cases, obtaining this content will comprise actually obtaining a copy of the content (which then may be stored at the centralized storage facility 715 going forward). In other cases, the centralized storage facility might merely obtain a reference to a location of the content (either from a database at the centralized storage facility 715, from receiving a positive response to a query issued to another storage device, etc). The centralized storage facility 715 then might provide the content to the intermediate storage device 710a (block 860), either by providing a reference to the location of the content, by providing the content itself (e.g., by transmitting a copy of the content), or by some other means.

The intermediate storage device 710a, then, can provide the content to the NPVR 125a (block 845). As with the provision of the content by the centralized storage facility 715, provision of the content to the NPVR 125a can comprise transmitting a copy of the content, transmitting a reference to a location of the content, etc. The NPVR then can provide the content to the subscriber (block 830). It should be noted that the disclosed architecture provides a great degree of flexibility in implementation.

Merely by way of example, in some cases, an NPVR may request content from an intermediate storage device, which, upon determining that it does not have the content, will forward the request to a centralized storage facility. The centralized storage facility, in some case, will locate the content and send a reference to the content, either directly to the requesting NPVR and/or to the intermediate storage device that forwarded the request. (Alternatively, the NPVR might request the content directly from the centralized storage facility, and/or the intermediate storage device might be omitted from the system.) The NPVR then could be responsible for requesting the content from the storage device on which the content is located, and that storage device could forward the content through the network to the requesting NPVR. In some cases, the storage device might be the centralized storage facility itself.

As another example, the centralized storage facility might obtain a copy of the content, store a copy of the content, and forward another copy of the content to the NPVR (either via the intermediate storage device itself or directly). The NPVR then could provide the content to the requesting subscriber, and optionally cache a local copy in the event the subscriber (and/or another subscriber served by the NPVR) later requests the content again.

Some embodiments are configured to distribute content (block 865) among the various nodes of the network (i.e., various local storage devices 705, intermediate storage devices 710 and/or centralized storage facilities 715). In some cases, this may be done to balance concerns of low latency to the subscriber, network efficiency, and storage space. Merely by way of example, consider a popular television series. Multiple copies of frequently-requested content (such as new episodes of the series) may be stored relatively near subscribers (e.g., at a storage device 705 local to an NPVR 125) to prevent excessive latency for subscribers and/or excessive network transmissions as copies are obtained from other locations. Other content (such as episodes from past seasons, etc.) may be stored in a relatively few locations (such as a centralized storage facility 715, a relative few intermediate storage devices 710, etc.); because relatively few requests are expected, concerns about minimizing storage requirements for the content may outweigh concerns about latency and/or network utilization. Still other content (such as past episodes from the current season, etc.) may be expected to be the subject of a moderate number of requests, and thus may be stored at other locations (such as each intermediate storage device 710) that require relatively few "hops" to reach a requesting NPVR, in order to avoid excessive storage requirements at the NPVR, but still provide relatively low latency and network utilization. (It should be noted that the television series is described for illustrative purposes, and that such content may be distributed differently in other embodiments; likewise, different types of content may be distributed in similar fashion to that described above.)

In some cases, as part of distributing content, one or more storage devices (including a centralized storage facility) and/or NPVRs may implement caching of content. Thus, for example, when an NPVR receives a request for a set of content from a subscriber, the NPVR might store the content for a specified period of time in anticipation of other requests. In addition, an intermediate storage device serving the NPVR might store the content for another specified period of time (which might be longer than the period specified for the NPVR), such that the content effectively rotates off of the NPVR after the first period but is still available from the intermediate storage device for the remainder of the second period, after which time it would need to be obtained again from the centralized storage facility (or any other available source). Any subsequent requests might reset these periods.

As noted above, in certain embodiments, one or more of the storage devices and/or NPVRs maintain a database of available content (block 870), as well as the locations from which that content is available. In a particular set of embodiments, the database may be partitioned among a plurality of data storage devices (e.g., 705, 710, 715), depending, in some cases, upon where content is stored. Merely by way of example, in some embodiments, a centralized storage facility 715 might have a complete database of all content available on the system 700, while an intermediate storage device 710a might have a partition of the database comprising only content that is stored on that storage device 710a and/or any storage devices 705a, 705b, 705c, 705d under the intermediate storage device 710 in the storage hierarchy. In some embodiments, then, an NPVR 125a might have a partition of the database comprising only content that is stored on storage devices 705a, 705b associated with that NPVR 125a.

In some embodiments, the database can be used to store not only an identifier of a set of content and/or the location(s) of the set of the content, but also a list of users associated with that content (e.g., a list of users who have requested that content). Merely by way of example, in a set of embodiments, an NPVR 125a might comprise a database (which may be a partition of a system-wide database and/or may be a separate database) comprising a list of subscribers (and/or subscriber connectivity devices 140a, 140b, 140c) served by that NPVR

125a, along with the content associated with each subscriber/connectivity device. The database might also comprise a reference to a location for each set of content, whether located at the NPVR or elsewhere on the system 700. This database can be used, for example, to populate an electronic program guide for a particular subscriber, showing the content the subscriber has "recorded." When a subscriber "records," uploads or otherwise requests additional sets of content, records for those sets of content can be stored in the database as well. As a subscriber "deletes" content from that subscriber's electronic program guide, the database entries can be modified to indicate that the subscriber no longer wishes to access the content—this modification can trigger the periods time before which the content should be removed from the NPVR's storage devices 705a, 705b and/or associated intermediate storage device 710a, as described above.

The database(s) implemented by the system 700 can have any appropriate structure. Merely by way of example, in some embodiments, a single database might be implemented, with a master copy at the centralized storage facility 715 (or in another appropriate location), and partitions and/or replicas stored at other storage devices/NPVRs. In other embodiments, each storage device might have its own database, which may be capable of communicating with databases at other devices. In yet other embodiments, hybrids of these two systems may be implemented.

Various procedures are known in the art for ensuring consistency between different partitions and/or replicas of databases, and any such procedure may be used in accordance with various embodiments. Merely by way of example, the centralized storage facility 715 might operate a replication engine that ensures that changes made to various databases (and/or partitions of a global database) are replicated as appropriate throughout the system 700. In other embodiments, when a storage device updates its database, it might send an update transaction to one or more other devices to notify those devices of the update; the other devices, in response, might update their own replicas/partitions/databases. Other updating methodologies may be used as well.

The distributed nature of the storage can be used to support a microbilling concept. Merely by way of example, a subscriber might be charged incrementally for content, depending on where the content is located. Merely by way of example, if a set of content is stored on a NPVR associated with the subscriber, the subscriber might be charged a first fee to view the content. If the content must be obtained from another device, the subscriber might be charged an additional fee (which might be relatively low) for the content, which could help offset the network costs for transporting and/or storing the content. Other variations are possible as well. Merely by way of example, a subscriber could be allocated an allotment of storage space that could be used for a variety of purposes, including without limitation archiving and/or offloading content from the subscriber's local PVR, PC, etc. This allotment could be billed (using traditional and/or microbilling concepts) and/or provided as part of a basic subscription fee.

Subscriber-side microbilling may be provided as well. Merely by way of example, if the subscriber has available storage space on a device (local PVR, PC, etc.) in communication with the network, that space can be used to store content (selected/provided either by the subscriber, the provider and/or another subscriber) and/or to serve such content to other subscribers. In such cases, the subscriber hosting the content may be compensated (perhaps using a microbilling concept and/or by deducting amounts from the subscriber's subscription fees) accordingly.

It should be noted that networked content storage can be incorporated with other aspects of the invention disclosed herein. Merely by way of example, as noted above, media conversion services may be performed when providing networked content to a subscriber. As another example, the networked storage system 700 of FIG. 7a may be used to provide content in a real-time on demand environment. For instance, advertising inserts and/or real-time material might be stored at a centralized storage facility 715 and incorporated into on-demand content stored at an NPVR 125 (and/or vice-versa) when provided to a subscriber.

Figure 7B:
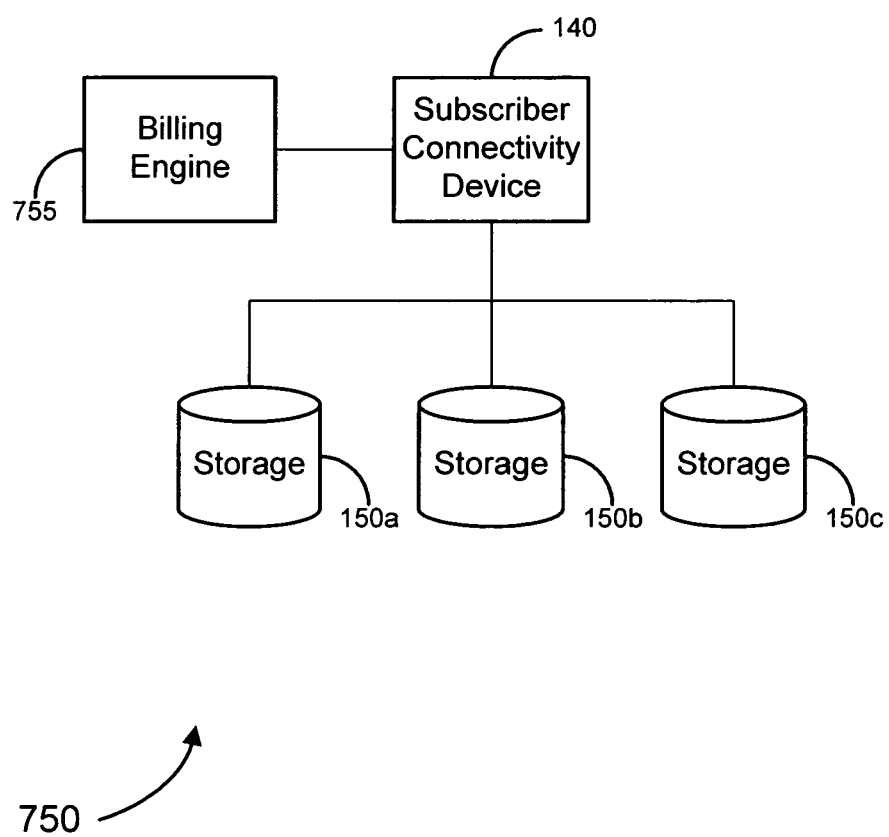
FIG. 7b illustrates a subscriber-side storage area network, in accordance with embodiments of the invention.

Merely by way of example, FIG. 7b illustrates a subscriber-side SAN 750 that can be used by a subscriber to store/host content, as described above. The SAN 750 comprises a subscriber connectivity device 140 and one or more storage devices 150 (which may be incorporated within and/or attached to the subscriber connectivity device 140, one or more subscriber devices 145 (not shown on FIG. 7b), etc.). The SAN 750 might also comprise a billing engine 755, which might be implemented as hardware and/or software within the subscriber connectivity device 145 and/or as a separate device.

The subscriber might choose to allocate space on one or more storage devices 150 to store content. This allocation might comprise merely setting aside space (such as on a separate disk, partition, etc.) for the network to download content to be stored and/or hosted. Alternatively, the allocation might comprise actually selecting the content to be stored/hosted. The system (e.g., an NPVR 125 within the network) might track content stored on the allocated space and/or provide a reference (e.g., to another system component, another subscriber, etc.) for the stored content. If the content is accessed, that access might be logged by the billing engine 755 and/or an access log might be uploaded periodically (and/or on demand, etc.) to the system (and/or a component thereof, such as an NPVR 125), such that billing credit could be awarded to the hosting subscriber.

5. Personal Broadcast Channels

A content distribution system in accordance with certain embodiments may be configured to provide a method for linking multiple on-demand and/or real-time content streams into a continuous channel (referred to herein as a "personal broadcast channel" or "PBC") for the subscriber. (Although referred to as a "broadcast" channel, it should be noted that a PBC need not be broadcast to a plurality of subscribers in the manner of a conventional broadcast channel—although this may be done in various embodiments. Rather, a PBC might be configured to appear to a subscriber as similar to a traditional broadcast channel—e.g., a PBC might be assigned a particular channel number on the subscriber's television, satellite, and/or cable television tuner, might be accessible in the same manner as traditional broadcast channels, and/or might provide relatively continuous programming, in a manner similar to that provided by traditional broadcast channels. Hence, a subscriber might be able to tune from a traditional channel (such as CNN, etc.) to a PBC, in much the same way the subscriber might tune from one traditional channel to another traditional channel.

A PBC, however, offers numerous advantages over a traditional broadcast channel. For one thing, a PBC might comprise (in some cases primarily or totally) content of the subscriber's choosing. In some cases PBC can provide multiple content types, (e.g., video, audio, voicemails, news clips, sports clips, etc.), including without limitation any of the types of content described above. The subscriber may be given the freedom to decide how the various content should be linked together and/or provided. Merely by way of example, a ROD server may be used to provide a mix of real-time and on-demand content in a PBC. In an aspect of the invention, for example, a tag would be placed in the PBC to indicate that the ROD server should obtain the latest version of certain content (such as a news broadcast, nightly show, etc.), while other content (such as a movie, etc.) could be obtained from an NPVR as on-demand content at the time that content is scheduled for viewing in the PBC.

Certain embodiments therefore provide flexibility in compiling content. In an aspect of the invention, the complied set of instructions that consists of the "recipe" of the content can be emailed or otherwise distributed to others. There may also be time sensitive or time constrained segments (such as real-time content) that essentially make the PBC appear as a broadcast channel with specific broadcast times, etc. Alternatively and/or additionally, the personal broadcast channel can be configured as a content "recipe" that can be used to deliver on-demand content. In this way, the user becomes the scheduler of the content and how they use it.

In a sense, the PBC can be thought of as an ordered set of content, which can be located in a subscriber's home, on one or more subscriber devices, and/or available by distribution (e.g., via an NPVR via the Internet, etc.). In an aspect of the invention, a PBC is defined by a set of metadata, which specifies, for example, the content to be provided in the PBC, the ordering of the content, etc.). In some embodiments, the metadata is integrated with the content in the PBC. In other embodiments, the metadata (referred to herein as a "PBC definition") can be divorced from the content itself. Hence, in some embodiments, a subscriber (or another) can distribute PBCs to other users for their enjoyment, while in other embodiments, the PBC definition can be distributed free of copyright concerns, and/or the recipient of a PBC definition (or, more likely, the recipient's NPVR, subscriber connectivity device, computer, etc) can be responsible for obtaining content in conformance with the PBC definition.

In some embodiments, therefore, subscribers, content creators, content distributors, advertisers, and/or others can sell these PBCs (and/or PBC definitions). Optionally, content may be "tagged" and/or otherwise accounted for, e.g., to allow billing users for viewing the content, to pay subscribers (or others) who create PBCs, to accommodate copyright restrictions, to pay content providers, to charge advertisers and/or pay subscribers for provided advertisements, etc.

Figure 9A:
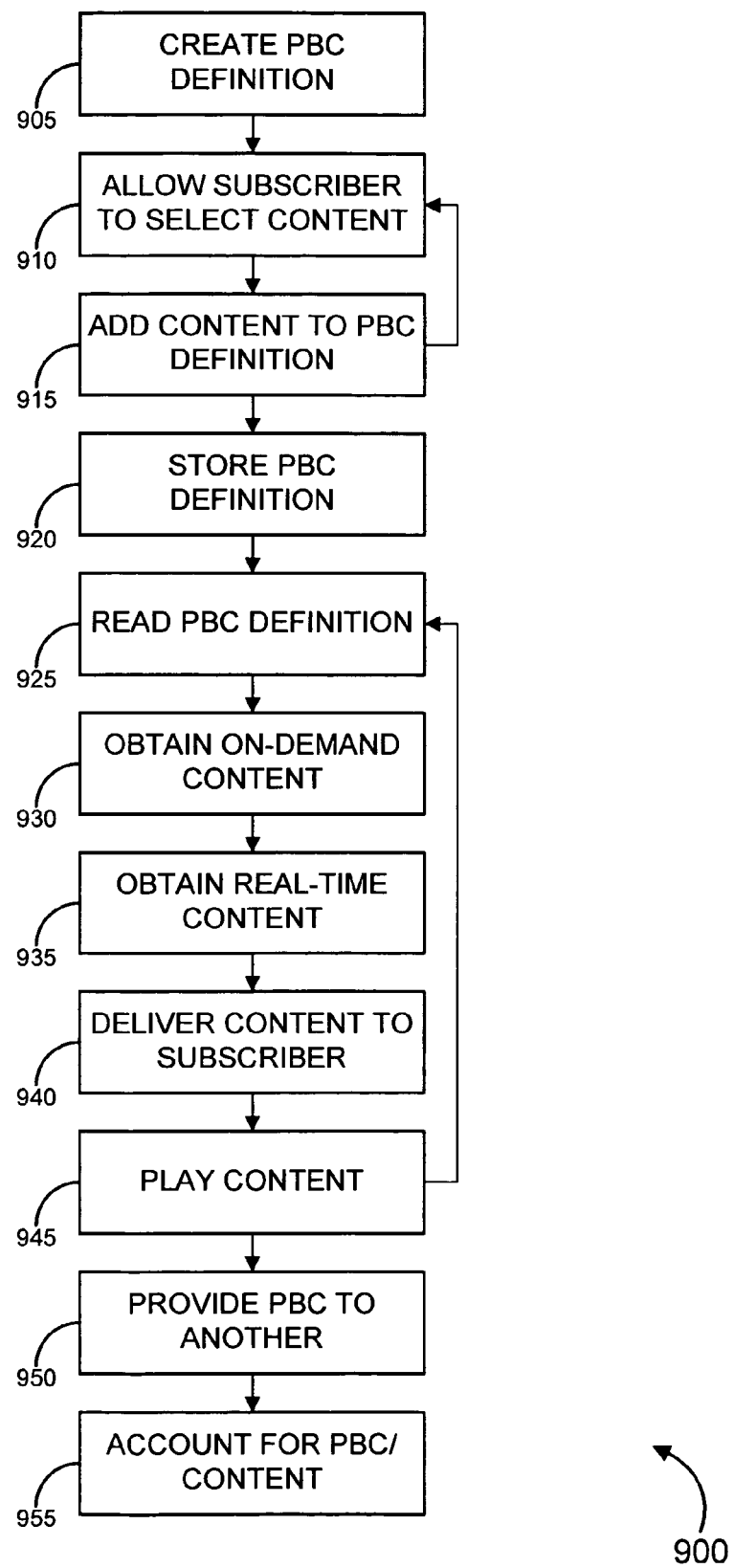
FIG. 9a is a process flow diagram illustrating a method of managing a personal broadcast channel for a subscriber, in accordance with embodiments of the invention.

FIG. 9a illustrates a method 900 of providing content in a PBC in accordance with some embodiments. At block 905, a PBC definition is created, and at block 910, the subscriber (and/or another) is allowed to select content for the PBC. The procedures for creating a PBC definition and selecting content can vary in accordance with different embodiments. For instance, as described in more detail below, in a set of embodiments, a PBC definition might comprise one or more XML files and/or RSS feeds, and/or creating the PBC definition might comprise creating the relevant file(s).

In some embodiments, an interface (including interfaces similar to those described above) may be provided to allow for the creation of a PBC definition and/or the selection of content. Merely by way of example, in a set of embodiments, a web interface is provided to allow a subscriber to select and/or arrange sets of content to form a PBC definition. In other embodiments, an interface may be provided via an EPG (through a set-top box, etc), to allow a subscriber to select content for a PBC from a television remote and/or the like. Other embodiments may provide a dedicated software application and/or an API to allow for streamlined creation of PBC definitions and/or selection of content (for example, by a content provider, etc.). An exemplary PBC creation/editing interface is described below with respect to FIG. 10c. As noted below, a PBC definition may comprise one or more XML files and/or RSS feeds, and the creation of a PBC definition and/or the selection of content therefore can comprise providing an XML editor (which might be simply a text editor) to allow a subscriber (and/or another) to create the definition from raw XML (it should be noted that graphical editors and other high-level development tools known in the art could be used as well).

The selected content (or, in some cases a reference to the selected content) may be added to the PBC definition (block 915). Once again, this procedure may vary with different embodiments. Merely by way of example, in cases where the PBC definition is an XML file and/or an RSS feed, adding content can comprise adding a reference to the content (such as a Universal Resource Identifier ("URI") for the content). This can be performed in any suitable way. For example, if an interface (such as a web interface, EPG interface, etc.) is used to select content, the interface can be configured to search for the content desired (for instance in a database of content as described above with respect to networked content storage) and automatically add an appropriate reference to the relevant PBC definition file. Alternatively, a user could manually insert a reference into the PBC definition file (with an editor, etc.). The procedures for selecting content and adding content to the PBC definition can be repeated until the user is satisfied with the content in the PBC. (It should be noted that content can be added at a later time to a previously-created PBC definition using procedures similar to those described above.)

The PBC definition (and/or the PBC, which could include the content as well) then may be stored (block 920). The storage location for the PBC/definition may vary depending on the embodiment. Merely by way of example, in some embodiments, the entire PBC (including content) may be stored at a subscriber's PC, set-top box, etc. and/or may be stored in the network (at an NPVR, in a data storage device in a networked content store, etc.) Alternatively, the PBC definition may be stored (e.g., at any of these locations, on a portable storage device such as a flash drive, etc.), and content may be obtained dynamically from the network (as described above, for example).

There are several ways for a subscriber to indicate that she wishes to view the content of a PBC. For example, in some embodiments, it is envisioned that an NPVR (or other network device) can provide a dedicated channel (which might be simply a virtual or emulated channel) for the PBC, and the subscriber can simply tune to that channel (using a remote, etc.), select the channel from an EPG (which might be provided by the NPVR, etc.), and/or the like. Alternatively, the user might access a URL associated with the PBC (perhaps via a web interface that provides a link to the PBC) and/or through any other appropriate method.

In some cases, the PBC may have associated timing information, such that when the subscriber selects the PBC, the content that is scheduled for that time will be provided (using, for example, a real-time model). In other cases, the user may be given the option to select from among some or all of the content in the PBC (using, for example, an on-demand model). In yet other cases, a hybrid of these two models may be used, such that the subscriber can select on-demand content at any time and/or real-time content at the time that content is current.

When the PBC is to be provided to the subscriber (for instance, when the subscriber selects the channel assigned to the PBC), the system (and/or a component thereof, such as an NPVR, a set-top box, a PC, etc.) will read the PBC definition (block 925) in order to determine what content should be provided as part of the PBC. Any on-demand content referenced by the PBC definition may obtained (block 930) and/or stored/buffered locally at the device providing the PBC for the subscriber (e.g., at an NPVR, set-top box, PC, etc.). Content may be obtained, merely to state a few examples, from a content provider, producer and/or distributor, from a networked content storage system, from a user's PC, from the Internet, etc. Similarly, any real-time content may be obtained (block 935). In accordance with some embodiments, a ROD server may be used to obtain real-time content and/or to integrate that content with on-demand content, as described above for example. If necessary, any media format conversion may be performed, e.g., by a media conversion server, also as described above. (In other cases, media conversion may be performed at the source of the content, before the content is obtained by the device providing the PBC.)

It should be noted that the procedures described with respect to blocks 925-935 may be performed when the subscriber (or another) requests the PBC content (as described above, for example), in other embodiments, those procedures may be performed beforehand. Merely by way of example, an NPVR may be configured to obtain content in a batch mode (such as during late-night hours and/or when network utilization is low, such that the procedures described with respect to some or all of blocks 925-935 may be performed, and/or content may be queued and/or stored at the NPVR, in anticipation of the subscriber requesting the PBC content at a later time.

At block 940, content is delivered to the subscriber, and at block 945, the content is played (and/or otherwise used by the subscriber). As noted above, the procedure and/or devices used to deliver and/or play the content may vary in accordance with different embodiments, and/or with the type of content being delivered. Any of the devices and/or procedures described above for delivering content may be used to deliver content from a PBC. Merely by way of example, content may be delivered from an NPVR to a subscriber's television and/or stereo, perhaps via a subscriber connectivity device.

In some cases, the procedures illustrated by block 925-945 may be performed iteratively, such that the PBC definition is read to determine a first set of content, which is obtained and delivered, and then after delivery of the first set of content, the process repeats for a second set of content. In other embodiments, an entire PBC definition might be read, and all of the referenced content obtained, before any is delivered. In other cases, hybrids of these two approaches might be used. For instance, a streaming concept might be employed, whereby the first set of content is obtained and delivered, and then additional content is obtained during the delivery of the first set of content. (Indeed, each individual set of content can be delivered in streaming fashion if desired.)

As noted above, some embodiments provide the ability to provide a PBC to another user (block 950), such as via electronic mail, file transfer, etc. Alternatively and/or in addition, an NPVR can be configured to display (via an EPG, web page, etc.) a list of PBCs that have been provided by others, and a subscriber can select a desired PBC to view. In some cases, users can "subscribe" to a PBC, such that updated versions of the PBC are periodically provided to the user and/or that the subscribed PBC appears as an option in the user's EPG, etc.

As described herein, in some cases content (which might be on-demand content and/or real-time content) may be set to expire after a certain deadline (e.g., for real-time content, when the content is no longer relevant and/or has been replaced with newer content, and/or for on-demand content, when a viewing window has closed, because of subscription obligations, licensing restrictions, etc.). In some cases, then, a set of content in a PBC can be marked with an expiration deadline. After the deadline, the content may be removed from the PBC, replaced with updated content, and/or the like. Optionally, the subscriber may be given the option to extend the deadline (perhaps accompanied by payment of an additional fee, etc.).

As noted above, in some cases, a PBC can include and/or accommodate advertising, and/or an advertiser can be provided with an interface (including without limitation a graphical interface) to provide advertisements for insertion into a PBC. More generally, in some embodiments, a variety of third parties (including without limitation, advertisers, service providers, associates of the subscriber, etc.) can be provided with the ability to insert content (advertising or otherwise) into a PBC. In some cases, the subscriber may be given an option to protect a PBC to prevent unauthorized editing. Merely by way of example, in a set of embodiments, a subscriber can be allowed to password-protect a PBC (perhaps with different levels of access control, such as viewing/using the PBC, copying the PBC, editing the PBC, etc.).

As noted above, depending on the embodiment, providing a PBC can comprise providing the entire PBC (including content), providing a PBC definition (such that the user to whom the PBC is provided, or that user's NPVR, set-top box, PC, etc. obtains the content from the source(s) of the content, perhaps based on references within the PBC definition), and/or some combination thereof. Merely by way of example, in some cases, on-demand content in a PBC distributed to others might be included with the distribution, while real-time content is obtained by the recipients of the PBC, e.g., to ensure that the real-time content is up to date. As another example, a distributed PBC might include some content that is not readily available from the source (such as content produced by the provider of the PBC) and merely include references to content that is readily available (from the source, from a networked content store, etc.). In other cases, a subscriber may include personal content in a PBC, but the distributed PBC definition may simply have a reference to a personal copy of that content (e.g., stored at the subscriber's NPVR, set-top box, PC, etc.). Other variations are possible as well.

In some embodiments, it may be appropriate to account for a PBC and/or the content thereof (block 955). For instance, in some cases, it may be necessary to collect royalties for the distribution of copyrighted content, and/or to restrict distribution of such content to licensed users. As another example, in some embodiments, a user may be billed for the use of another's PBC (including the PBC definition and/or the content of the PBC)—the billing may be microbilling, in that a user is charged a nominal fee (such as $0.01) for each reference to a set of content within a PBC, etc. In some cases, the distribution of a PBC created by a subscriber may be used to offset's the subscriber's fees from the operator of the content distribution system. The system, therefore may track the distribution and/or use of PBCs to facilitate such accounting.

In other embodiments, a PBC (and/or some or all of the content therein) might be sponsored by advertising revenue. Hence, such PBCs might have optional and/or mandatory advertising inserts. Merely by way of example, the system might insert a reference to advertising content into a PBC after it has been created by a user. In other cases, the user might be given a choice between different advertisers (and/or categories of advertisers), and advertisements from those advertisers (and/or categories thereof) might be inserted into the PBC. In various embodiments, insertion of advertising into a PBC might comprise adding a reference to advertising content in a PBC definition. Alternatively and/or additionally, the NPVR (and/or another appropriate device) might be configured to insert advertising content into pre-defined gaps in content, between sets of content, etc., without requiring any reference in the PBC definition.

Figure 9B:
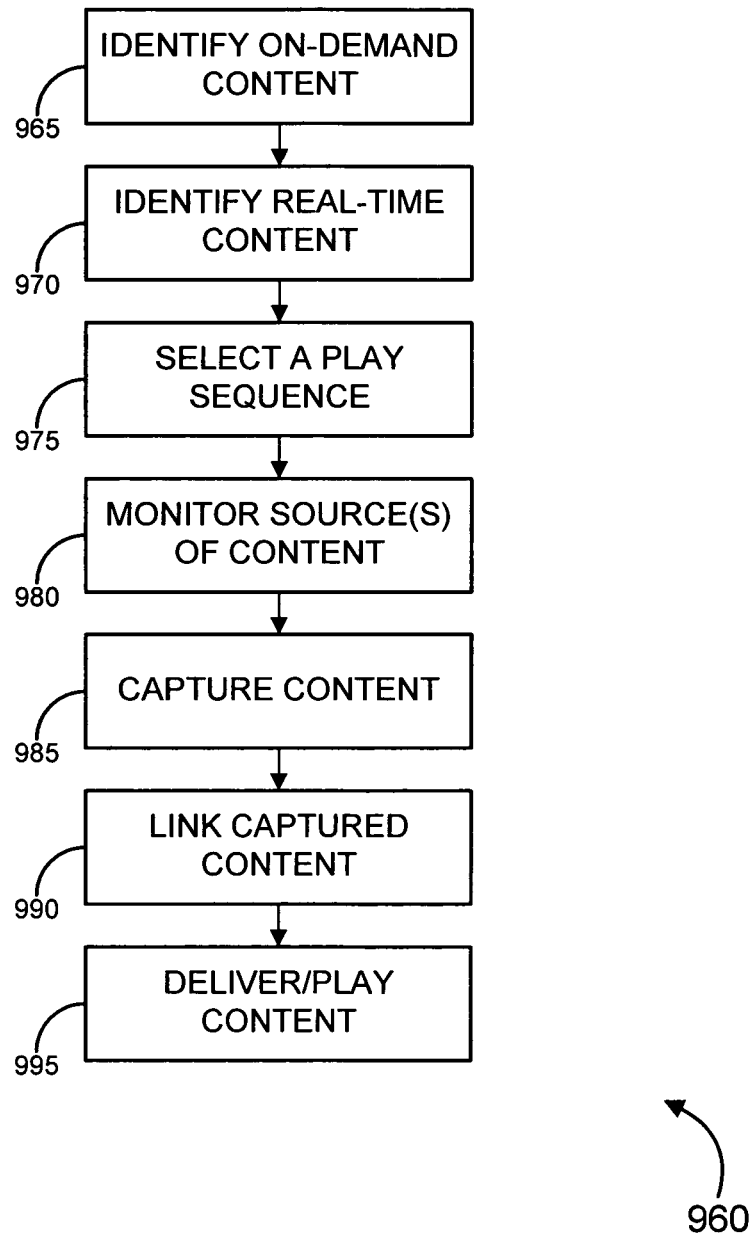
FIG. 9b is a process flow diagram illustrating a method of creating a broadcast channel of on-demand content, in accordance with embodiments of the invention.

FIG. 9b illustrates a method 960 of providing a broadcast channel comprising on-demand content, in accordance with a set of embodiments. In some cases, the method 960 is implemented in conjunction with the method 900 of FIG. 9a. In other cases, the method 960 may implement certain procedures described with respect to the method 900 of FIG. 9a. The method 960 comprises allowing a user to identify one or more sets of on-demand video content, such as video programs (block 965). Identifying such content can take any suitable form, including via the procedures described above. Merely by way of example, in some cases, identifying content can comprise selecting that content in an EPG, selecting programs on a web page provided by a video content provider, adding content to a PBC, etc. The user may also be allowed to identify one or more sets of real-time content (block 970), such as real-time video programs, etc. The identification of real-time content may be performed using procedures similar to those used to identify on-demand content.

The user may also be allowed to select a play-sequence for the content (block 975). The play-sequence, in some cases, can identify an order of play for the content (whether on-demand or real-time). A variety of procedures can be used to select a play-sequence. Merely by way of example, the arrangement of content in a particular order in a PBC can serve as a selection of a play sequence for that content. Other methods are possible as well. For instance, a user might use a web page and/or an EPG to arrange identified sets of content (e.g., video programs). In some cases, the web page and/or EPG may serve as an interface to a PBC creation tool, as described in detail above.

At block 980, one or more sources of content are monitored. The sources of content can include networked content stores, NPVRs, content providers/producers, and/or the like. Monitoring such sources can include searching sources for the identified content, searching a database for a reference to the identified content, etc. Such searches can be performed periodically and/or upon demand (e.g., when the user desires to watch the content, when the content is first identified, etc.). Monitoring content therefore can comprise any of the procedures described above with respect to networked content storage, to name but a few examples. The content can be captured and/or obtained from the source(s) of the content (block 985), for instance as described above.

Captured content can then be linked (block 990) in order to arrange the captured content into the sequence defined by the play sequence. At block 995, the sequenced content can then be delivered to the user (as described above, for instance, by transmitting the content to a subscriber connectivity device, etc.) and/or displayed (e.g., on a user's television set, computer screen, etc.).

Figure 10A:
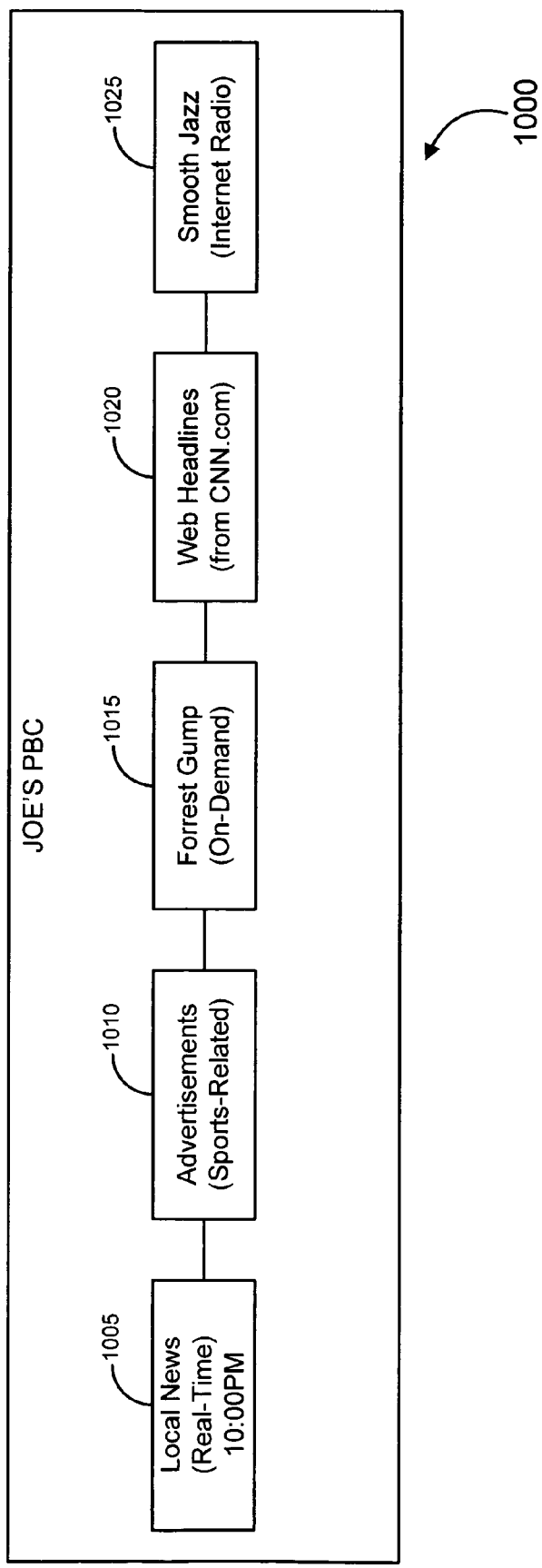
FIG. 10a illustrates a set of content in a personal broadcast channel, in accordance with embodiments of the invention.

FIG. 10a illustrates a PBC 1000 in accordance with a set of embodiments, while FIG. 10b illustrates a portion of an exemplary PBC definition 1030 for the PBC 1000 of FIG. 10a. The PBC 1000 includes a set of real-time content comprising local news 1005, an advertising insert 1010, a set of on-demand content comprising the movie "Forrest Gump" 1015, a set of headlines from the CNN.com web site 1020, and a three-hour block of music from an Internet radio station 1025. In certain embodiments, the user can tune to the PBC channel for Joe's PBC, and the appropriate content will be delivered, in the specified order. In another set of embodiments, an EPG, web page, etc., might display all of the content in the PBC 1000, and allow the user to select from among the content (assuming the content is on-demand content or current/pre-recorded real-time content).

In the exemplary PBC definition 1030, each set of content 1005-1025 is defined by an entry (referred to by numerals 1035-1060, respectively). The exemplary PBC definition 1030 uses a tagged format similar to HTML or XML, although other formats (such as relational database records, etc.) are possible as well. Each of the entries 1035-1060 includes relevant information, such as start time (for real-time content), running length, title, and a reference (in this case, a URI) to a location for the content. It should be noted that, while the PBC 1000 and PBC definition 1030 of FIGS. 10a and 10b are provided for illustrative purposes, embodiments of the invention are not limited to either the types of content illustrated in the PBC 1000 or the type (and format) of information provided in the PBC definition 1030.

Figure 10C:
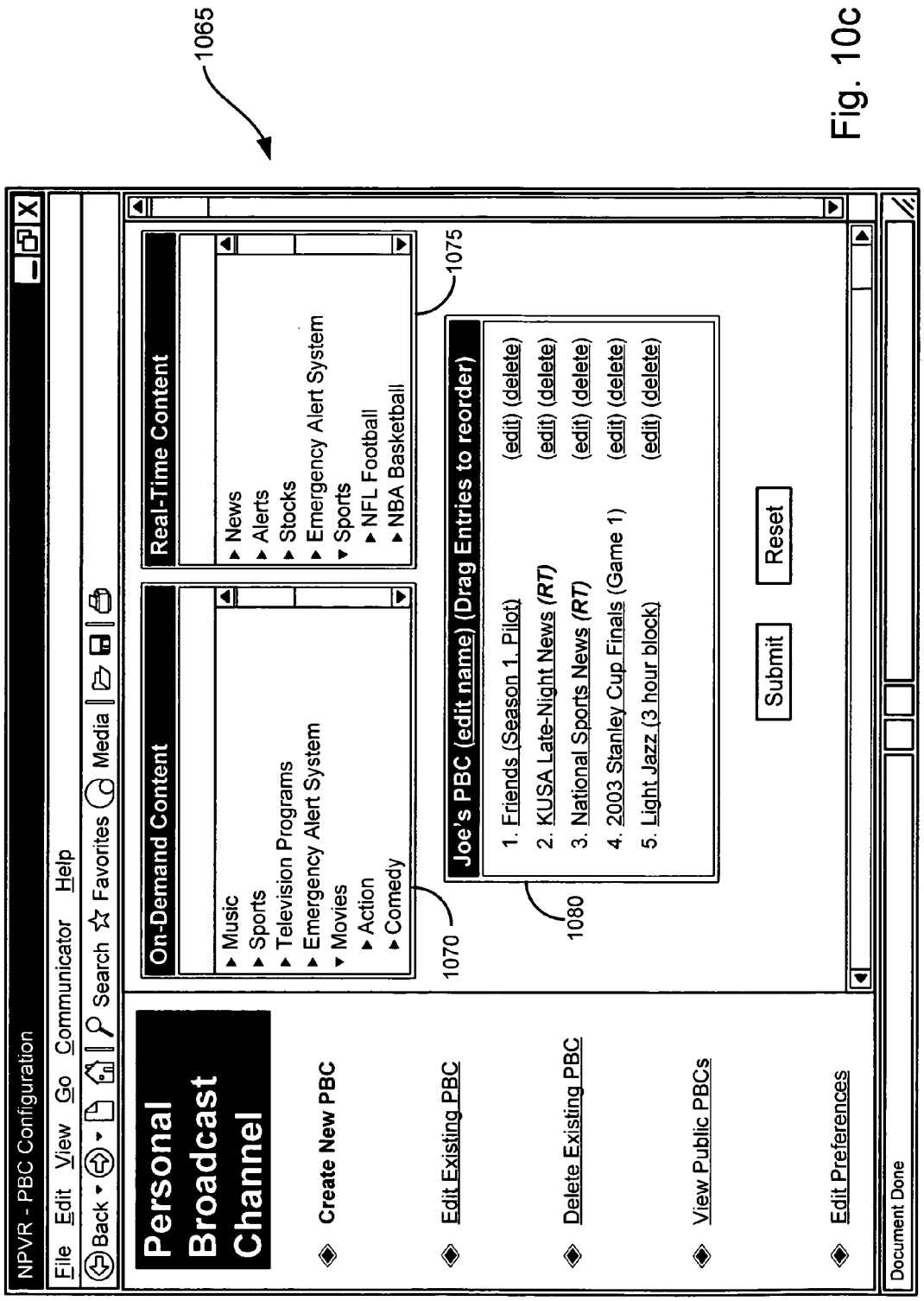
FIG. 10c illustrates an exemplary interface for configuring a personal broadcast channel, in accordance with embodiments of the invention.

FIG. 10c illustrates an exemplary user interface 1065 that can be used to configure a PBC and/or a PBC definition. The user interface 1065 might be provided via a variety of means, including without limitation via an EPG on a subscriber television, via a web site (accessible either via the provider's network—e.g., via a private web site available from a connection through a subscriber connectivity device—and/or via a public web site available to any browser in communication with the Internet, perhaps with password validation or some other form of subscriber authentication). The user interface 1065 (and/or a similar interface) might be also be provided by a dedicated software program, via a WAP-compatible web page and/or a java applet (which might be accessible by a wireless phone, PDA, etc.) and/or the like. In various embodiments, as noted above, any of the interfaces described herein can be used to configure a PBC and/or PBC definition.

The user interface 1065 can provide a selection 1070 of available on-demand content (perhaps organized by type of content, and within content types, within subject matter, etc.) and/or a selection 1075 of available real-time content (which might be organized similarly). The user interface 1065 might also provide a window 1080 illustrating the content sets in the currently-selected PBC (which might be organized by play order). The subscriber can be given the option to select on-demand and/or real-time content (e.g., by selecting a link associated with a particular set of content, by dragging an identifier of the content to the window 1080, etc.) to be placed in the PBC. The subscriber can also be given the option to order the content (e.g., by dragging content identifiers within the window 1080 or via any other appropriate method). In some embodiments, the on-demand content and the real-time content may be organized within a single playlist (e.g., as illustrated by FIG. 10c). In other embodiments, the selected real-time content might be maintained in a separate window/playlist, such that it is inserted into the PBC whenever it is available in real-time, regardless of what the PBC playlist currently has scheduled. In some embodiments, the subscriber can be given a choice between these options.

Merely by way of example, if the subscriber elects to incorporate real-time content into an ordered playlist, the real-time content may be recorded and provided to the subscriber as on-demand content in the order specified by the playlist. In particular embodiments, different sets of real-time content may be treated in different ways (perhaps at the option of the user), such that certain real-time content (e.g., local news) is provided according to the schedule defined by the playlist, while other real-time content (e.g., EAS alerts) is provided in real-time, whenever that content is available and/or irrespective of what content is scheduled at that time by the PBC playlist). Based on the disclosure herein, one skilled in the art will appreciate that a great degree of flexibility may be provided by the concept of PBCs, and that various other scheduling options are available.

6. Exemplary Hardware Configuration

Figure 11:
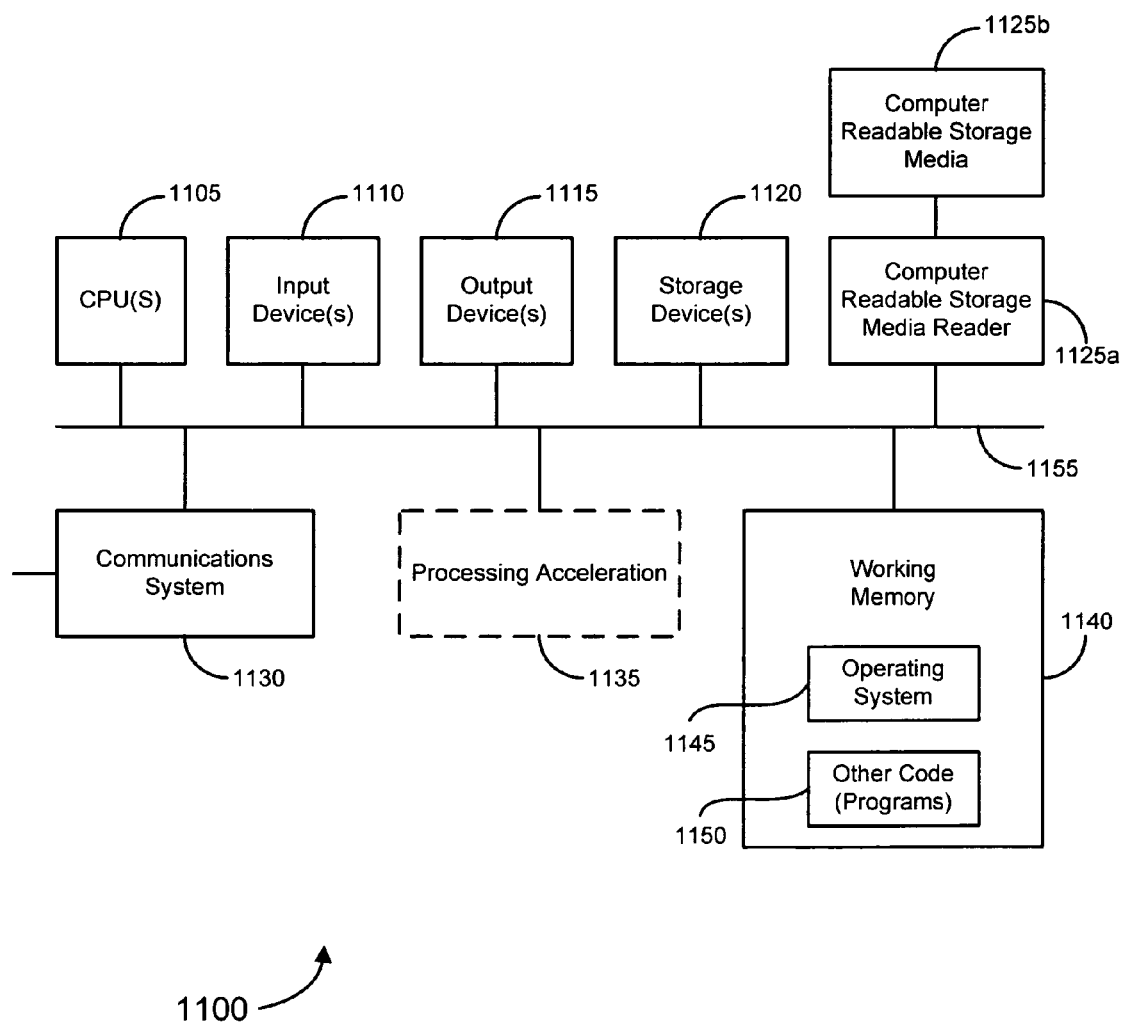
FIG. 11 is a generalized schematic diagram illustrating exemplary components of various devices that may be used in accordance with various embodiments of the invention.

FIG. 11 provides a generic schematic illustration of a structure a device 1100 that may be used to implement the MCS 120, NPVR 125, ROD server 130, subscriber connectivity device 140 and/or various subscriber devices 145, in accordance with certain embodiments of the invention. Those skilled in the art will appreciate that various modifications and/or customizations of the device 1100 may be appropriate, depending on the role of the device 1100 in various embodiments. Hence, FIG. 11 should be understood to illustrate broadly how individual device elements may be implemented in a relatively separated or relatively more integrated manner. The device 1100 is shown comprised of hardware elements that are electrically coupled via bus 1155, including a processor 1105, an input device 1110, an output device 1115, one or more storage device(s) 1120, a computer-readable storage media reader 1125a, a communications system 1130, a processing acceleration unit 1135 such as a DSP and/or other special-purpose processor, and a memory 1150. The computer-readable storage media reader 1125a may be further connected to a computer-readable storage medium 1125b, the combination comprehensively representing remote, local, fixed, and/or removable storage devices plus storage media for temporarily and/or more permanently containing computer-readable information. The communications system 1130 may comprise a wired, wireless, modem, and/or other type of interfacing connection and permits data to be exchanged with the various other system components.

The device 1100 may also comprise software elements, shown as being currently located within working memory 1140, including an operating system 1145 and other code 1150, such as one or more application programs designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of providing real-time content in a content-on-demand environment, the method comprising:
   monitoring at least one source of real-time content;
   identifying a first set of live broadcast video content that should be provided to a subscriber;
   obtaining the identified first set of live broadcast video content;
   providing the identified first set of live broadcast video content through a content-on-demand environment, such that the identified first set of live broadcast video content is available in real-time or at a later time to the subscriber;
   identifying a second set of live broadcast video content that should be provided to the subscriber;
   obtaining the second set of live broadcast video content;
   determining that the second set of live broadcast video content supercedes the first set of live broadcast video content, wherein determining that the second set of live broadcast video content supersedes the first set of live broadcast video content comprises determining whether the second set of live broadcast video content is an update of the first set of live broadcast video content that should replace the first set of live broadcast video content, by receiving and analyzing new entries in a rich site summary ("RSS") feed, periodically checking the second set of live broadcast video content against the first set of live broadcast video content, and analyzing filenames of the first and second sets of live broadcast video content; and
   providing the second set of live broadcast video content through the content-on-demand environment, based on the determination that the second set of live broadcast video content supersedes the first set of live broadcast video content, such that the second set of live broadcast video content replaces the first set of live broadcast video content and is available in real-time or at a later time to the subscriber.

2. A method of providing real-time content as recited in claim 1, the method further comprising:
   maintaining the first set of live broadcast video content so that the first set of live broadcast video content is also available on-demand to the subscriber.

3. A method of providing real-time content as recited in claim 2, the method further comprising:
   determining that the first set of live broadcast video content has expired; and
   based on a determination that the first set of live broadcast video content has expired, discontinuing the maintenance of the first set of live broadcast video content, such that the first set of live broadcast video content is no longer available on-demand to the subscriber.

4. A method of providing real-time content as recited in claim 3, wherein determining that the first set of live broadcast video content has expired comprises
   determining that a relevance window associated with the first set of live broadcast video content has expired.

5. A method of providing real-time content as recited in claim 1,
   wherein the content-on-demand environment comprises a video-on-demand distribution network.

6. A method of providing real-time content as recited in claim 5,
   wherein the video-on-demand distribution network comprises at least one of a group consisting of: a cable television distribution network; a satellite television distribution network; and an xDSL video distribution network.

7. A method of providing real-time content as recited in claim 5, wherein providing the first set of live broadcast video content comprises:
   displaying the first set of live broadcast video content on a real-time channel provided by the video-on-demand distribution network.

8. A method of providing real-time content as recited in claim 1, wherein providing the first set of live broadcast video content comprises:
   notifying the subscriber that the first set of live broadcast video content is available.

9. A method of providing real-time content as recited in claim 8,
   wherein notifying the subscriber comprises displaying an indicator on a consumer device.

10. A method of providing real-time content as recited in claim 9, further comprising
    providing the subscriber with an option to make visible a link embedded in the indicator,
    wherein the link refers to other content related to the link, such that when the option is selected, the link will remain visible at all times while the indicator is displayed,
    while if the option is not selected, the link will be visible only when an area associated with the link is selected.

11. A method of providing real-time content as recited in claim 9,
    wherein the indicator is at least one of a group consisting of:
    a picture-in-picture window;
    a pop-up window; and
    a notification icon.

12. A method of providing real-time content as recited in claim 8,
    wherein notifying the subscriber comprises transmitting a text message for reception by at least one of a pager, a wireless telephone and an online chat application.

13. A method of providing real-time content as recited in claim 8,
    wherein notifying the subscriber comprises transmitting an e-mail message for reception by the subscriber.

14. A method of providing real-time content as recited in claim 8,
    wherein notifying the subscriber comprises initiating a telephone call to a telephone associated with the subscriber.

15. A method of providing real-time content as recited in claim 1, the method further comprising:
    storing the first set of live broadcast video content.

16. A method of providing real-time content as recited in claim 15,
    wherein storing the first set of live broadcast video content comprises storing the first set of live broadcast video content on a network storage device selected from the group consisting of: a network media recorder; and a network content library.

17. A method of providing real-time content as recited in claim 15,
    wherein storing first set of live broadcast video content comprises storing the first set of live broadcast video content on a personal video recorder.

18. A method of providing real-time content as recited in claim 1,
    wherein providing the first set of live broadcast video content comprises inserting the first set of live broadcast video content into a stream of on-demand content.

19. A method of providing real-time content as recited in claim 1,
    wherein providing the first set of live broadcast video content comprises transmitting the first set of live broadcast video content for reception by a consumer device in communication with the content-on-demand environment.

20. A method of providing real-time content as recited in claim 19,
    wherein the consumer device is at least one device selected from the group consisting of: a wired telephone; a wireless telephone; a personal digital assistant; a television; a personal computer; a set-top box; an Internet Protocol network interface device; a personal video recorder; and a portable media device.

21. A method of providing real-time content as recited in claim 1,
    wherein the first set of live broadcast video content comprises a video stream.

22. A method of providing real-time content as recited in claim 21,
    wherein the video stream is selected from the group consisting of: a high-bit-rate digital video stream; a low-bit-rate digital video stream; an MPEG video; a proprietary video format; a digital video file; and an analog video stream.

23. A method of providing real-time content as recited in claim 1,
    wherein the first set of live broadcast video content comprises an audio stream.

24. A method of providing real-time content as recited in claim 1,
    wherein the first set of live broadcast video content further comprises a report selected from the group consisting of: a traffic report; a stock report; a news report; a weather report; and urgent public information.

25. A method of providing real-time content as recited in claim 1,
    wherein the first set of live broadcast video content is formatted in a first format, the method further comprising converting the first set of live broadcast video content to a second format.

26. A method of providing real-time content as recited in claim 25,
    wherein the second format is specified by a profile for first set of live broadcast video content.

27. A method of providing real-time content as recited in claim 25, further comprising:
    charging the subscriber a fee for converting the set of downloadable content.

28. A method of providing real-time content as recited in claim 27, wherein charging the subscriber a fee comprises charging the subscriber a monthly fee.

29. A method of providing real-time content as recited in claim 27,
wherein charging the subscriber a fee comprises charging the subscriber a per-transaction fee.

30. A method of providing real-time content as recited in claim 1, further comprising:
inserting an advertisement into the first set of real-time content.

31. A method of providing real-time content as recited in claim 30, wherein the advertisement is associated with an advertiser, the method further comprising:
billing the advertiser an advertising fee associated with the provision of the first set of live broadcast video content.

32. A method of providing real-time content as recited in claim 1, further comprising:
filtering the first set of live broadcast video content according to an option specified in a subscriber profile,
such that the first set of live broadcast video content, when provided to the subscriber, does not include any material that the subscriber has indicated the subscriber does not wish to receive.

33. A system for providing real-time content in a content-on-demand environment, the system comprising one or more computers having instructions executable to perform the method of claim 1.

34. A method of providing real-time content in a content-on-demand environment, the method comprising:
receiving at a server a first set of live broadcast video content;
determining that the first set of live broadcast video content should be provided to a subscriber; and
providing the identified set of live broadcast video content through a content-on-demand environment, such that the live broadcast video content is available in real-time or at a later time to the subscriber;
receiving a second set of live broadcast video content;
determining that the second set of live broadcast video content should be provided to the subscriber;
determining that the second set of live broadcast video content supercedes the first set of live broadcast video content, wherein determining that the second set of live broadcast video content supersedes the first set of live broadcast video content comprises determining whether the second set of live broadcast video content is an update of the first set of live broadcast video content that should replace the first set of live broadcast video content, by of receiving and analyzing new entries in a rich site summary ("RSS") feed, periodically checking the second set of live broadcast video content against the first set of live broadcast video content, and analyzing filenames of the first and second sets of live broadcast video content; and
providing the second set of live broadcast video content through the content-on-demand environment, based on the determination that the second set of live broadcast video content supersedes the first set of live broadcast video content, such that the second set of live broadcast video content replaces the first set of live broadcast video content and is available in real-time or at a later time to the subscriber.

35. A system for providing real-time content in a content-on-demand environment, the system comprising one or more computers having instructions executable to perform the method of claim 34.

36. A system for providing real-time content in a content-on-demand environment, the system comprising:
a real-time content monitor server configured to:
monitor at least one source of real-time content; and
identify a first set of live broadcast video content that should be provided to a subscriber;
a network update transmission server configured to:
obtain the first set of live broadcast video content; and
a subscriber interface configured to:
provide the first set of live broadcast video content through a content-on-demand environment, such that the first set of live broadcast video content is available in real-time or at a later time to the subscriber;
wherein the real-time content monitor server is further configured to identify a second set of live broadcast video content that should be provided to the subscriber;
the network update transmission server is further configured to obtain the second set of live broadcast video content; and
determine that the second set of live broadcast video content supercedes the first set of live broadcast video content, wherein determining that the second set of live broadcast video content supersedes the first set of live broadcast video content comprises determining whether the second set of live broadcast video content is an update of the first set of live broadcast video content that should replace the first set of live broadcast video content, by receiving and analyzing new entries in a rich site summary ("RSS") feed, periodically checking the second set of live broadcast video content against the first set of live broadcast video content, and analyzing filenames of the first and second sets of live broadcast video content; and
the subscriber interface is further configured to provide the second set of live broadcast video content through the content-on-demand environment, based on the determination that the second set of live broadcast video content supersedes the first set of live broadcast video content, such that the second set of live broadcast video content replaces the first set of live broadcast video content and is available in real-time or at a later time to the subscriber.

37. A system for providing real-time content as recited in claim 26, the system further comprising:
a network storage device configured to store the first set of live broadcast video content.

38. A system for providing real-time content as recited in claim 37,
wherein the network storage device comprises at least one device selected from the group consisting of:
a network media recorder; and
a network content library.

39. A system for providing real-time content as recited in claim 36,
wherein the subscriber interface comprises a networked personal video recorder.

40. A non-transitory computer readable storage medium having stored thereon a computer program for providing real-time content to a subscriber, the computer program comprising a set of instructions executable by one or more processors, the set of instructions comprising:
instructions to cause a real-time content monitor server to monitor at least one source of live broadcast video content;

instructions to cause the real-time content monitor server to identify a first set of live broadcast video content that should be provided to a subscriber;

instructions to cause a network update transmission server to obtain the identified first set of live broadcast video content;

instructions to cause a subscriber interface to provide the identified first set of live broadcast video content through a content-on-demand environment, such that the identified first set of live broadcast video content is available in real-time or at a later time to the subscriber;

instructions to cause the real-time content monitor server to identify a second set of live broadcast video content that should be provided to the subscriber;

instructions to cause the network update transmission server to obtain the second set of live broadcast video content;

instructions to cause the network update transmission server to determine that the second set of live broadcast video content supercedes the first set of live broadcast video content, by determining whether the second set of live broadcast video content is an update of the first set of live broadcast video content that should replace the first set of live broadcast video content, by receiving and analyzing new entries in a rich site summary ("RSS") feed, periodically checking the second set of live broadcast video content against the first set of live broadcast video content, and analyzing filenames of the first and second sets of live broadcast video content; and instructions to cause the subscriber interface to provide the second set of live broadcast video content through the content-on-demand environment, based on the determination that the second set of live broadcast video content supersedes the first set of live broadcast video content, such that the second set of live broadcast video content replaces the first set of live broadcast video content and is available in real-time or at a later time to the subscriber.

* * * * *